United States Patent
Manabe et al.

(10) Patent No.: US 6,507,326 B2
(45) Date of Patent: Jan. 14, 2003

(54) COLOR-PROJECTION APPARATUS OPERABLE TO PROJECT A HIGH-CONTRAST IMAGE WITH MINIMAL CHANGE IN THE STATE OR PHASE OF POLARIZATION OF LIGHT FLUX

(75) Inventors: Yuji Manabe, Kamakura (JP); Tetsuo Hattori, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/887,770

(22) Filed: Jun. 22, 2001

(65) Prior Publication Data

US 2001/0033253 A1 Oct. 25, 2001

Related U.S. Application Data

(63) Continuation of application No. 09/514,987, filed on Feb. 29, 2000.

(30) Foreign Application Priority Data

Jul. 10, 1996  (JP) .............................. 8-180266
Nov. 6, 1996  (JP) ............................. 8-310076

(51) Int. Cl.[7] .............................. G09G 3/00; G09G 3/12; G09G 3/10; G02B 26/00; G02B 1/00; G02B 27/14
(52) U.S. Cl. .............................. 345/32; 345/48; 345/36; 359/292; 359/490; 359/587; 359/634; 349/8; 349/9; 348/744; 348/750; 353/8; 353/31
(58) Field of Search ................................. 358/487, 471, 358/475, 480, 509, 512, 451, 598; 382/211, 312; 349/9, 8, 1, 2, 5, 7, 12, 14, 27, 33, 34, 116; 359/292–295, 587, 618, 634, 490, 496, 629, 638; 353/31–33, 20; 348/766, 333, 744, 743, 750–751, 757–763; 345/10, 36, 38, 45, 48, 50–51, 32, 84, 87–89, 102, 104, 204, 214

(56) References Cited

U.S. PATENT DOCUMENTS 4,127,322 A    11/1978  Jacobson et al.
4,650,286 A  *  3/1987  Koda .......................... 350/331
4,826,311 A  *  5/1989  Ledebuhr ..................... 353/31

(List continued on next page.)

FOREIGN PATENT DOCUMENTS

JP    5-82793          11/1993
JP    409330036     *  12/1997      .............. G09F/9/09
JP    2000089166    *   3/2000      ............. G02B/5/00

Primary Examiner—Matthew Luu
Assistant Examiner—Wesner Sajous
(74) Attorney, Agent, or Firm—Klarquist Sparkman LLP

(57) ABSTRACT

To suppress light loss without deteriorating resolution of a projected image, light is first polarized and separated by a polarizing beam splitter. Green light is separated from a light flux emitted by the polarizing beam splitter by a dichroic mirror having a green light reflection property. A light flux containing blue and red light, which is transmitted by the dichroic mirror, is separated into red light and blue light by a dichroic prism. Resultant color light is modulated and reflected by reflection light valves, returned to the corresponding dichroic mirror or dichroic prism, and combined by the dichroic mirror and the dichroic prism. Resultant combined color light is projected via the polarizing beam splitter and a projection lens. The dichroic prism transmits s-polarized light having wavelengths less than a wavelength substantially within a wavelength band of green light and reflects s-polarized light having larger wavelengths. The dichroic prism transmits p-polarized light having wavelengths less than a wavelength substantially within a wavelength band of green light and reflects p-polarized light having smaller wavelengths.

43 Claims, 16 Drawing Sheets

U.S. PATENT DOCUMENTS

| | | | | |
|---|---|---|---|---|
| 5,028,121 A | * | 7/1991 | Baur | 353/31 |
| 5,073,013 A | * | 12/1991 | Sonehara | 359/63 |
| 5,115,305 A | * | 5/1992 | Baur | 348/757 |
| 5,295,018 A | | 3/1994 | Konuma et al. | |
| 5,327,270 A | | 7/1994 | Miyatake | |
| 5,398,081 A | * | 3/1995 | Jones | 348/72 |
| 5,459,593 A | | 10/1995 | Ootaki | |
| 5,577,826 A | | 11/1996 | Kasama et al. | |
| 5,648,870 A | * | 7/1997 | Mistukate | 359/587 |
| 5,653,520 A | | 8/1997 | Kato | |
| 5,658,060 A | * | 8/1997 | Dove | 353/33 |
| 5,786,934 A | * | 7/1998 | Chiu | 348/751 |
| 5,800,033 A | | 9/1998 | Funanami et al. | |
| 5,812,233 A | | 9/1998 | Walsh | |
| 5,815,221 A | | 9/1998 | Kojima | |
| 5,854,707 A | | 12/1998 | Kasama | |
| 5,863,125 A | * | 1/1999 | Doany | 348/743 |
| 5,903,323 A | | 5/1999 | Ernstoff | |
| 5,946,054 A | * | 8/1999 | Sannobe et al. | 348/745 |
| 5,959,778 A | * | 9/1999 | Shimonura et al. | 359/618 |
| 6,141,151 A | * | 10/2000 | Shimonura et al. | 359/618 |
| 6,327,093 B1 | * | 12/2001 | Nakanishi et al. | 359/634 |
| 6,379,010 B1 | * | 4/2002 | Suzuki et al. | 353/31 |

* cited by examiner

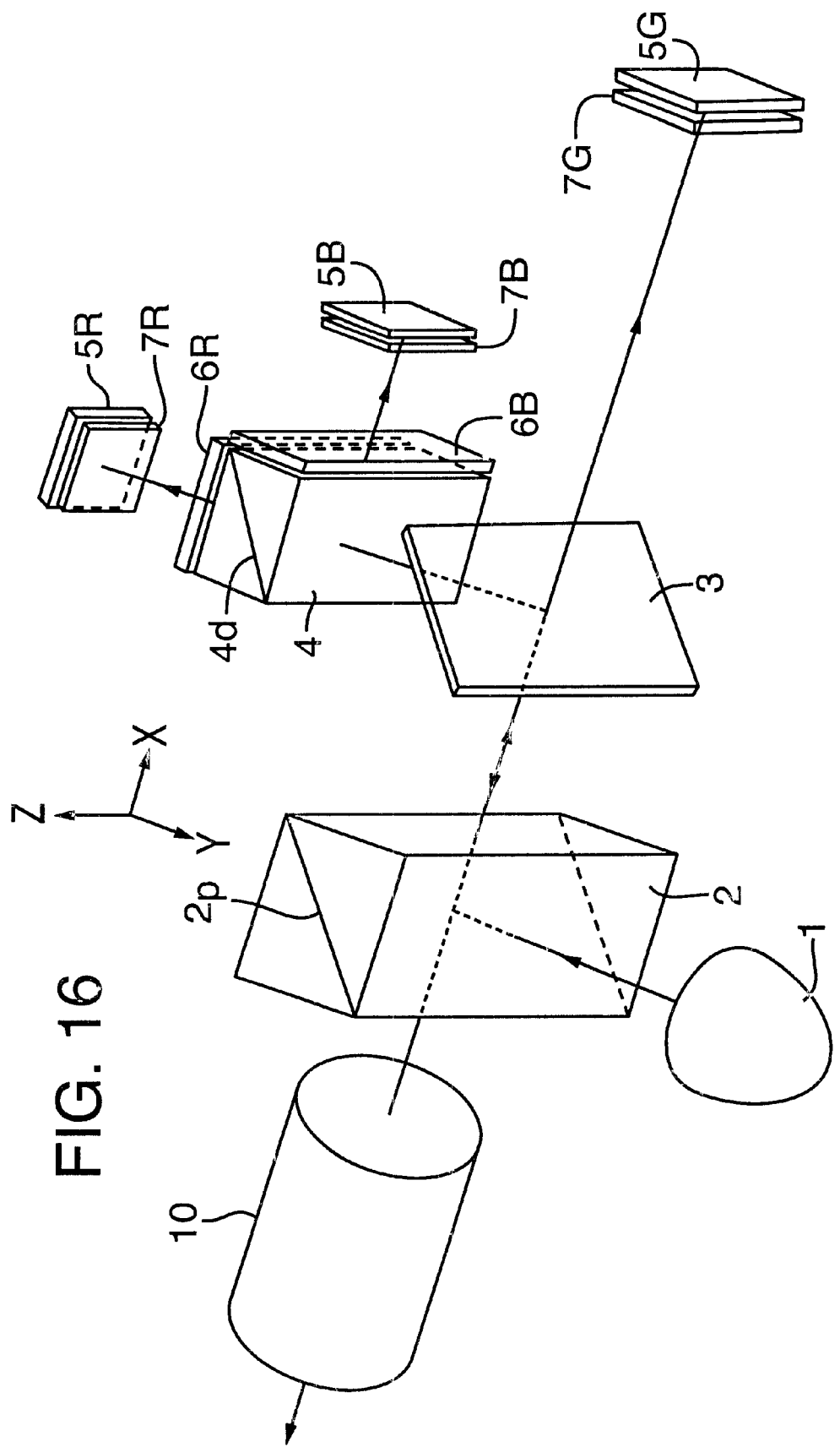

COLOR-PROJECTION APPARATUS OPERABLE TO PROJECT A HIGH-CONTRAST IMAGE WITH MINIMAL CHANGE IN THE STATE OR PHASE OF POLARIZATION OF LIGHT FLUX

This application is a continuation of 09/514,987 filed Feb. 29, 2000.

FIELD OF THE INVENTION

This invention pertains to color projection apparatus. More specifically, this invention pertains to color projection apparatus operable to separate an illumination-light flux into multiple colors of light, create color images, combine such color images, and project the combined color images onto a viewing surface.

BACKGROUND OF THE INVENTION

A prior-art color projection device using reflection-type light valves, shown in FIG. 5, is disclosed in Japanese Unexamined Patent Publication No. 63-39294. In the FIG. 5 apparatus, a white illumination-light flux is emitted from a light source 223 that comprises, for example, a halogen lamp. The illumination-light flux typically passes through a collimating lens 222 operable to make parallel the rays comprising the illumination-light flux. The illumination-light flux then enters a polarizing beam splitter (PBS) 221 disposes along the optical axis O of a color separation optical system 211.

S-polarized light of the illumination-light flux is reflected by the PBS 221 and is incident on the color-separation optical system 211. The s-polarized light incident on the color-separation optical system 211 is separated into the three primary colors, red (R), blue (B), and green (G), as follows.

The color separation optical system 211 includes a first prism 211A, a second prism 211B, and a third prism 211C, each disposes as shown in FIG. 5. A surface 211e of the first prism 211A is coated with an evaporated, thin dichroic film which reflects blue light but transmits light with longer wavelengths (i.e., red and green light). There is a gap between the first prism 211A and the second prism 211B. A thin, dichroic film, which reflects red light but transmits green light, is coated on a surface 211f of the second prism 211B, between the second prism 211B and the third prism 211C.

As the illumination-light flux reflected from the PBS 221 enters through surface 211a of the first prism 211A, blue light is reflected by the surface 211e and is then reflected inwardly by the surface 211a toward an emergence surface 211b of the first prism. Red light that passes through the surface 211e of the first prism 211A is reflected by the surface 211f and is then reflected inwardly by the surface of the second prism 211B between the first and second prisms. The inwardly reflected red light then exits through an emergence surface 211c of the second prism 211B. Green light that passes through the surface 211e of the first prism 211A and through the surface 211f of the second prism 211B travels toward an emergence surface 211d of the third prism 211C.

Reference numerals 212, 213, and 214 denote two-dimensional reflection-type liquid crystal light valves (LCLVs) for displaying a blue light image, a red light image, and a green light image, respectively. Each of the reflective-type LCLVs have dielectric reflecting layers 215, 216, and 217, respectively, formed on the back of transmission-type LCLVs so that the LCLVs operate as reflection-type LCLVs. As each color of light enters a respective LCLV, the light is modulated by the respective LCLV. Hence, each color's video signal is converted into an image that has a transmission-rate distribution at the respective LCLV.

The modulated color light is then reflected and changed in polarization state by 90°. That is, the s-polarized light is converted by the LCLV to p-polarized light. The modulated and reflected color lights travel along reverse paths through the first, second and third prisms 211A, 211B, 211C, respectively, to be combined into a single light flux. The resultant combined, single light flux emerges from the incidence plane of the first prism 211A. The light flux whose polarization state has been converted is passed through the PBS 221 and projected on a screen 235 by a projection lens 224.

A problem with the conventional example shown in FIG. 5 is its inability to provide sufficiently high-contrast projected images. The conventional projection device example described herein does not project an idea "black" image on the screen for the following reasons.

As linearly polarized light fluxes are incident on the dichroic films, after being passed through the PBS 221, the light flux is in part transmitted and in part reflected by the dichroic films. The s-polarized light and p-polarized light of the transmitted and reflected light fluxes are determined by a vector n normal to each dichroic film surface and a propagation vector T of the incident light flux. The vectors s of the s-polarized light is determined by s=n×T. Whenever a light flux is incident on a dichroic film in a manner such that the linear polarization plane is not in a plane defined by a line normal to the dichroic film surface and the propagation direction of the incident light, the light flux is separated into s-polarized light and p-polarized light, and a phase difference is imposed between the s-polarized light and p-polarized light. As a result, the resultant light flux typically behaves as elliptically polarized light. Hence, the light flux traveling through the PBS 221 includes light of undesirable polarization. The PBS 221 then directs the undesirable polarized light toward the screen 225. Accordingly, an ideal black image is not projected on the screen 225. Additionally, the contrast of the projected image is poor.

One known technique to solve the above problem has been disclosed in Japanese Unexamined Patent Publication No. 6-175123 wherein a special compensation plate is utilized to compensate for the light-flux polarization phase difference. In this technique, however, it is required to precisely control the light flux state of polarization at both the dichroic films and the compensation plate.

Another prior-art color projection device, shown in FIG. 6, is disclosed in Japanese Examined Patent Publication No. 5-82793. In the FIG. 6 apparatus, a plurality of dichroic films are operable to separate a white illumination-light flux emitted from a light source into the three primary light colors of red (R), green (G), and blue (B). The separated color lights are directed to respective LCLVs that modulate the color lights. Each color light, including the modulated color light, is reflected or emitted according to signals associated with the color light. Dichroic films are used to combine the color light and the resulting combined color light is projected on a screen by a projection lens.

The prior art color projection device of FIG. 6 includes a white illumination-light source comprising a lamp 20 and an elliptical mirror 21. Light rays comprising the illumination-light flux emitted from the light source 20 are made substantially parallel by a collimator lens 22. The light flux then passes through an opening 23a, defined by a light-interceptive plate 23, and a filter 24 operable to allow only visible light to pass therethrough. The light flux is directed toward a polarizing beam splitter (PBS) 16. The light flux incident on the PBS 16 is separated into s-polarized light, which is reflected by the PBS 16, and p-polarized light which is transmitted by the PBS 16 and subsequently discarded.

The s-polarized light is separated into blue light, red light, and green light by a blue-light reflection dichroic prism 17 and a red-light reflection dichroic prism 18. The separated color lights are routed to respective LCLVs 1B, 1G, and 1R. The color lights are modulated by the LCLVs 1B, 1G, and 1R to p-polarized light. Hence, each color's video signal is converted into an image that has a transmission-rate distribution at the respective LCLV. The modulated color lights are reflected from the respective LCLVs 1B, 1G, and 1R, back to the corresponding dichroic prisms 17 and 18.

The color lights are then combined by the dichroic prisms 17 and 18 and directed to the PBS 16. The PBS 16 transmits p-polarized light (i.e., signal light) and directs the combined p-polarized light flux toward a screen 26 through a projection lens 25. The dichroic prisms 17 and 18 comprise the prior art color separation/combination optical system.

In the above-described prior art color projection device, a considerable amount of light is wasted (i.e., does not contribute to the projected image) resulting in an image having poor color balance and poor contrast. Consequently, an ideal black image cannot be projected. The reason for the poor color balance, poor contrast, and poor black image appears to relate to the dichroism of the dichroic prisms employed in the prior art device.

More particularly, depending upon the polarization state of the light flux, the dichroism of a dichroic prism may vary significantly. FIG. 7 illustrates the variance in dichroism of a red light reflection dichroic prism similar to the dichroic prism utilized in the prior art color projection device shown in FIG. 6.

The curve of FIG. 7 is based on an assumption that the s-polarized light and the p-polarized light fall on the dichroic film of the dichroic prism at an angle of incidence of about 45°. In FIG. 7, transmittance values are recorded on the Y-axis and wavelength values on the X-axis.

As illustrated by the curve in FIG. 7, p-polarized light having wavelengths less than about 500 nm and serving as a p-polarized light boundary wavelength is substantially reflected. P-polarized light having wavelengths greater than 500 nm is substantially transmitted. By contrast, s-polarized light having wavelengths less than about 580 nm, serving as an s-polarized light boundary wavelength, is substantially reflected, while s-polarized light having wavelengths greater than 580 nm is substantially transmitted.

Accordingly, with a dichroic prism, there exits a substantial difference between the transmission/reflection boundary wavelength for p-polarized light (about 500 nm) and the transmission/reflection boundary wavelength for s-polarized light (about 580 nm). Hence the dichroism of the dichroic prism varies greatly for p-polarized light versus s-polarized light.

In the prior art color projection device shown in FIG. 6, the light flux that is projected on the screen is the light flux that has been modulated from s-polarized light to p-polarized light by the LCLVs 1R, 1G, and 1B. The dichroic prisms 17 and 18 separate color light according to the dichroism relative to s-polarized light. The dichroic prisms 17 and 18 combine the modulated color light according to the dichroism relative to p-polarized light.

Since the dichroisms for s-polarized light and p-polarized light vary as discussed above, a significant amount of light reflected by the LCLVs into the dichroic prisms 17, 18 to be combined and projected is lost (i.e., does not contribute to the projected image). Additionally, the difference in dichroism for the different polarized lights results in an image having poor color balance. Specifically, the amount of light actually projected may be determined by the product of the dichroism attained when the s-polarized light passes through the dichroic prism and the dichroism attained when the p-polarized light passes through the dichroic prism.

In the prior art projection device shown in FIG. 6, if dichroic mirrors are substituted for the dichroic prisms 17 and 18 and the dichroic mirrors are located obliquely with respect to an optical axis as shown, astigmatism occurs. The astigmatism deteriorates the resolution of a projected image.

Moreover, the prior-art projection device shown in FIG. 6 and described above projects an image having poor contrast. Specifically, whenever the LCLVs fail to modulate light according to the color signals, the reflected light flux emanating from the LCLVs is s-polarized. The s-polarized light is combined by the dichroic prisms and discarded by the polarizing beam splitter. Consequently, the contrast of the projected image on the screen is poor.

Particularly, in the FIG. -6 device, when linearly polarized light produced by the PBS 16 falls on a dichroic prism, the directions of s-polarized light and p-polarized light are determined by a vector n having a direction normal to the dichroic film of the dichroic prism and a vector T in the propagation direction of incident light. A vector S in the direction of s-polarization, is expressed as S=n×T.

Whenever a light flux is incident on a dichroic prism in such a manner that the linear polarization plane is not in the plane defined by a line normal to the dichroic film surface and the propagation direction of the incident light, the light flux is separated into s-polarized light and p-polarized light, and a phase difference occurs between the s-polarized light and p-polarized light. As a result of the change in the state of polarization of the light flux, the resultant light flux typically behaves as elliptically polarized light. Unwanted polarized light is, thus, superposed on light that is projected on the screen. This results in a deterioration of the blackness and contrast of a projected image on the screen.

SUMMARY OF THE INVENTION

In view of the foregoing short comings of the prior art, an object of the present invention to provide a color projection apparatus having a simply constructed polarizing optical system including a plurality of dichroic mirrors capable of projecting a high-contrast image without encountering a change in the state or phase of polarization of the light flux. Additionally, an object of the present invention is to provide a color projection apparatus that projects an ideal black image, excellent image color balance, and contrast (i.e., resolution).

To attain dichroism that varies insignificantly between p-polarized light and s-polarized light, it has been found that dichroic mirrors formed by coating a dichroic film on the surface of, for example, a glass plate, can be substituted for the dichroic prisms. The dichroism of a dichroic mirror can be illustrated in FIG. 8. The dichroic mirror is coated with a dichroic film identical to the dichroic film in the dichroic prism having the dichroism shown in FIG. 7.

The curve in FIG. 8 is based on the assumption that the s-polarized light and the p-polarized light fall on the dichroic mirror at an angle of incidence of about 45°. In FIG. 8, transmittance values are recorded on the Y axis and wavelength values on the X axis. The transmission/reflection boundary wavelength for the p-polarized light is approximately 500 nm and the transmission/reflection boundary wavelength of the s-polarized light is approximately 520 nm. The difference in transmission/reflection boundary wavelengths for the p-polarized light versus the s-polarized light is, thus considerably reduced compared to FIG. 7.

According to a first embodiment, a color-projection apparatus is provided comprising : (1) a polarizing beam splitter (PBS) for splitting a light flux emitted from a light source; (2) dichroic mirrors for separating a light flux polarized in a single direction, which light flux has been split by the PBS into blue (B), green (G), and red (R) color lights; and (3) reflection-type light valves for modulating the respective R, G, B color lights obtained by the respective dichroic mirrors.

Color lights emerging from the LCLVs are incident on the dichroic mirrors. The dichroic mirrors combine the color lights into a single light flux. The combined light flux is incident on the PBS and is projected by a projection lens onto a screen or other viewing surface. The PBS includes a polarization-splitting film operable to split incident light into s-polarized light and p-polarized light.

The dichroic mirrors are operable to separate a light flux into the primary color lights (R, G, B) and to combine the color lights R, G, B into a single light flux. The polarizing-splitting film of the PBS and the dichroic mirrors are disposed substantially parallel with one another so that the linear polarization plane is in the plane defined by lines normal to the dichroic mirror surfaces and the propagation direction of the incident light. Accordingly, the light flux is not separated into s-polarized light and p-polarized light, and a phase difference does not occur between s-polarized light and p-polarized light. Quarter-wave plates are disposed along the optical path between the corresponding dichroic mirror and the light valve of each respective primary color.

According to a second embodiment, a color projection apparatus is provided that differs from the first embodiment in that the elements of the second embodiment are arranged so that the PBS transmits a p-polarized light from an incident illumination-light flux to fall on a dichroic mirror while discarding the s-polarized light.

According to a third embodiment, a color-projection apparatus is provided that comprises: (1) a PBS for splitting an illumination-light flux emitted from a light source; (2) a dichroic mirror for separating the first polarized light into green light and light containing both blue light and red light; (3) a dichroic prism for separating the light, comprising both blue and red light, into blue light and red light; and (4) LCLVs for modulating the respective R, G, B color lights produced by the dichroic mirror and the dichroic prism. The dichroic mirror is operable to: (1) substantially transmit or reflect s-polarized light having wavelengths less than a first transmission/reflection boundary wavelength (a "first λ") that is near a boundary wavelength between green light and blue light (about 500 nm), (2) substantially transmit or reflect s-polarized light having wavelengths greater than a second transmission/reflection boundary wavelength (a "second λ") that is near a boundary wavelength between green light and red light (about 590 nm), (3) substantially reflect or transmit s-polarized light having wavelengths within a wavelength range of from about the first λ to about the second λ, (4) substantially transmit or reflect p-polarized light having wavelengths less than a third transmission/reflection boundary wavelength (a "third λ") that is near the boundary wavelength between the green light and blue light (about 500 nm), (5) substantially transmit or reflect p-polarized light having wavelengths greater than a fourth transmission/reflection boundary wavelength (a "fourth λ") that is near the boundary wavelength between the green light and red light (about 590 nm), and (6) reflect or transmit p-polarized light having wavelengths within a wavelength range of from about the third λ to about the fourth λ.

The dichroic prism in the third embodiment is operable to: (1) substantially transmit or reflect s-polarized light having wavelengths less than a fifth transmission/reflection boundary wavelength (a "fifth λ"), (2) substantially reflect or transmit s-polarized light having wavelengths greater than the fifth λ, (3) substantially transmit or reflect p-polarized light having wavelengths less than a sixth transmission/reflection boundary wavelength (a "sixth λ"), and (4) substantially reflect or transmit p-polarized light having wavelengths greater than the sixth λ, wherein (5) the fifth λ and the sixth λ are within a wavelength range of from about the first λ or third λ to about the second λ of the fourth λ.

A projection apparatus according to the third embodiment provides the advantage that the dichroic mirror employed has a small difference in dichroism between s-polarized light and p-polarized light. Thus, only significant amounts of light are lost and more light contributes to the projected image. Additionally, the dichroic prism that exhibits a larger difference in dichroism between s-polarized light and p-polarized light provides the advantage of excellent image contrast or resolution. Consequently, light loss is suppressed, image color balance is improved, and deterioration of image resolution or contrast is minimized.

Additionally, according to the third embodiment, the projection apparatus includes both a dichroic mirror and a dichroic prism. Because a dichroic prism is not significantly affected by the external environment (unlike a dichroic mirror), the overall system is less susceptible to environmental influences compared to a system having two dichroic mirrors.

A color-projection apparatus according to a sixth embodiment of the present invention includes one or more quarter-wave plates. The quarter-wave plates are arranged between the dichroic mirror and the corresponding LCLV and/or between a dichroic prism and the corresponding LCLV. The quarter-wave plate(s) are, preferably, disposed substantially perpendicular to the optical axis. Axes of advancement or axes of retardation of the quarter-wave plates, are preferably, substantially contained on planes defined by lines normal to the dichroic film of the dichroic mirror and/or the dichroic prism and the optical axis. Whenever the quarter-wave plates are arranged as described, separated-then-combined color light directed to the PBS contains no significant amount of undesirable polarized light component. Accordingly, the blackness and contrast of the projected image are significantly improved.

The fourth embodiment preferably further includes a second trimming filter interposed between the dichroic prism and the corresponding LCLV for eliminating red light, separated by and emitted from the dichroic prism, having wavelengths near the wavelength band of green light (from about 500 nm to about 560 nm).

According to a fifth embodiment of the color projection apparatus of the present invention, a dichroic film of a PBS, a dichroic film of a dichroic mirror, and a polarizing-splitting film of a dichroic prism are disposed substantially parallel with one another. With such an arrangement, the directions of p-polarization and s-polarization defined by the dichroic films are substantially consistent with one another.

Accordingly, light flux entering the PBS after contacting the various dichroic films includes only relatively small amounts of undesirable polarized light components. Deterioration of the blackness and contrast of the projected image is minimized.

A color-projection apparatus according to a sixth embodiment of the present invention includes one or more quarter-wave plates. The quarter-wave plates are arranged between the dichroic mirror and the corresponding LCLV and/or between a dichroic prism and the corresponding LCLV. The quarter-wave plate(s) are, preferably, disposed substantially perpendicular to the optical axis. Axes of advancement or axes of retardation of the quarter-wave plates are, preferably, substantially contained on plates defined by lines normal to the dichroic film of the dichroic mirror and/or the dichroic prism and the optical axis. When the quarter-wave plates are arranged as described, separated-then-combined color light directed to the PBS contains no significant amount of undesirable polarized light component. Accordingly, the blackness and contrast of the projected image is significantly improved.

The foregoing and other features and advantages of the present invention will be more readily apparent from the following detailed description which proceeds with reference to the accompanying drawings.

BRIEF DESCRIPTION OF THE DRAWINGS

FIG. 16 is an optical diagram of another example embodiment employing a dichroic mirror having a green-light transmission property.

DETAILED DESCRIPTION

Figure 1:
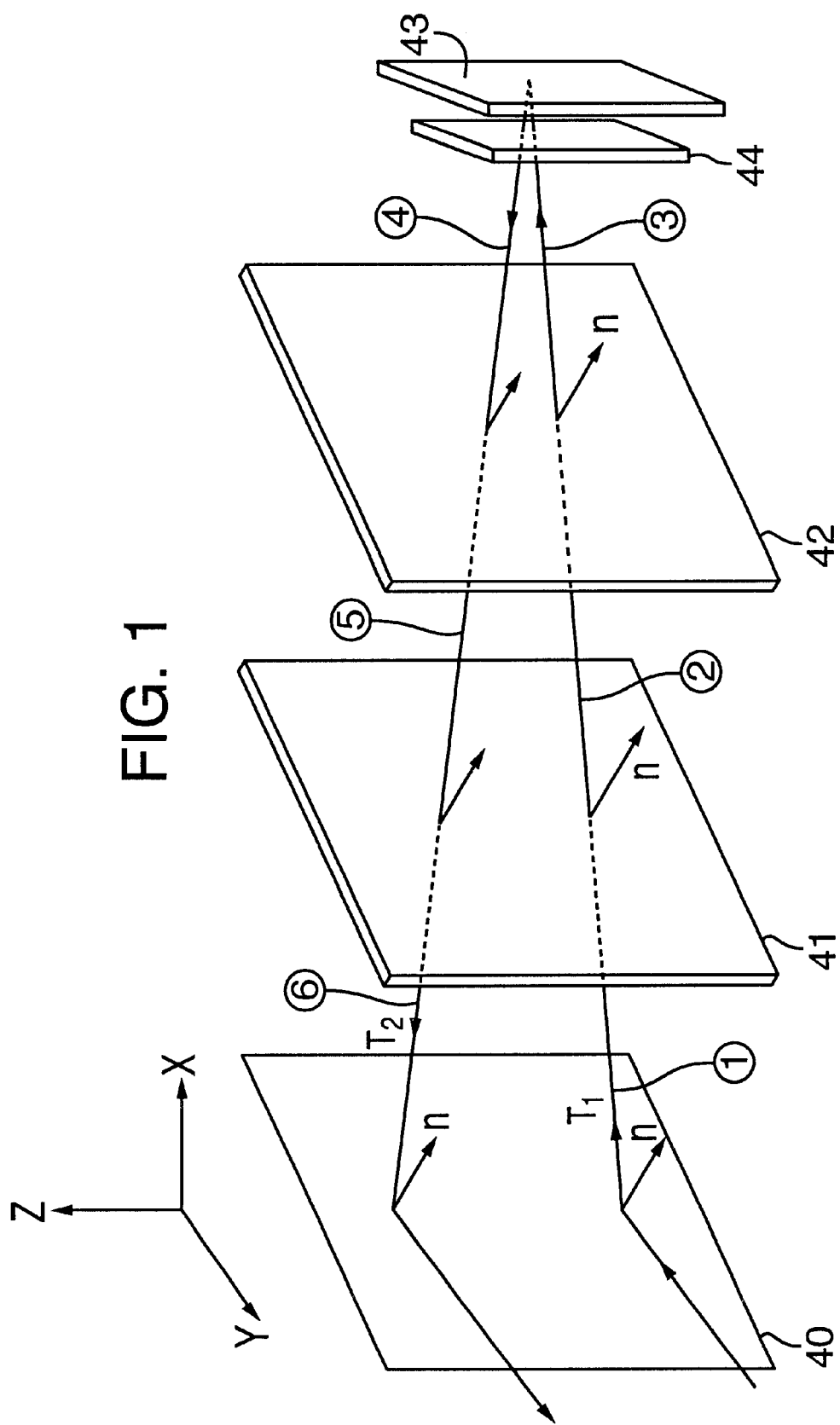
FIG. 1 is an optical diagram showing certain general features of a preferred embodiment of the color projection apparatus of the present invention.

FIG. 1 shows certain general features of a preferred embodiment of the color projection apparatus of the present invention and illustrates certain advantages of the color projection apparatus of the present invention. The apparatus shown in FIG. 1 is operable to separate a linearly polarized light flux into three primary color lights and to combine the three color lights into a single light flux. The apparatus includes reflecting dichroic mirrors 41, 42 disposed such that a change in the state of polarization of the light flux passing through them or reflecting from them does not occur. Accordingly, the light flux is not separated into s-polarized light and p-polarized light (i.e., no double refraction of the light flux is caused) by the color projection apparatus.

The apparatus of FIG. 1 comprises a polarization-splitting part 40 of a polarizing beam splitter (shown in FIG. 3 and FIG. 4), dichroic mirrors 41, 42 and a reflecting mirror 43.

The reflecting mirror 43 shown in FIG. 1 is included for illustrative purposes only. That is, as described below, the embodiments of the present invention utilize a LCLV in the position of reflecting mirror 43 to form an image that will be projected on a screen or other viewing surface. The reflecting mirror 43 is employed in the apparatus shown in FIG. 1 to illustrate the principle of the projection apparatus of the present invention. Specifically, that the color projection apparatus of the present invention projects of an image without changing the polarization state of an illumination-light flux as the light flux travels through the apparatus.

A quarter-wave plate 44 is disposed along the X axis between the dichroic mirror 42 and the reflecting mirror 43 in a manner such that the quarter-wave plate 44 is positioned substantially parallel with the ZY plane. Additionally, the propagation axis of the quarter-wave plate 44 is, preferably, oriented parallel with the Z axis.

A white illumination-light flux is emitted from a light source (not shown) so as to be incident on the polarization-splitting part 40 of a PBS. S-polarizing light of the illuminated-light flux is separated and reflected by the polarization-splitting part 40. The separated s-polarized light travels in a direction T1 through the dichroic mirrors 41, 42 toward the quarter-wave plate 44. The s-polarized light is then reflected by the reflecting mirror 43 in a direction T2, toward the polarization-splitting part 40 after passing through the quarter-wave plate 44 and the dichroic mirrors 41, 42. The s-polarized light is then reflected by the polarization splitting part 40 toward the light source (not shown).

Figure 2:
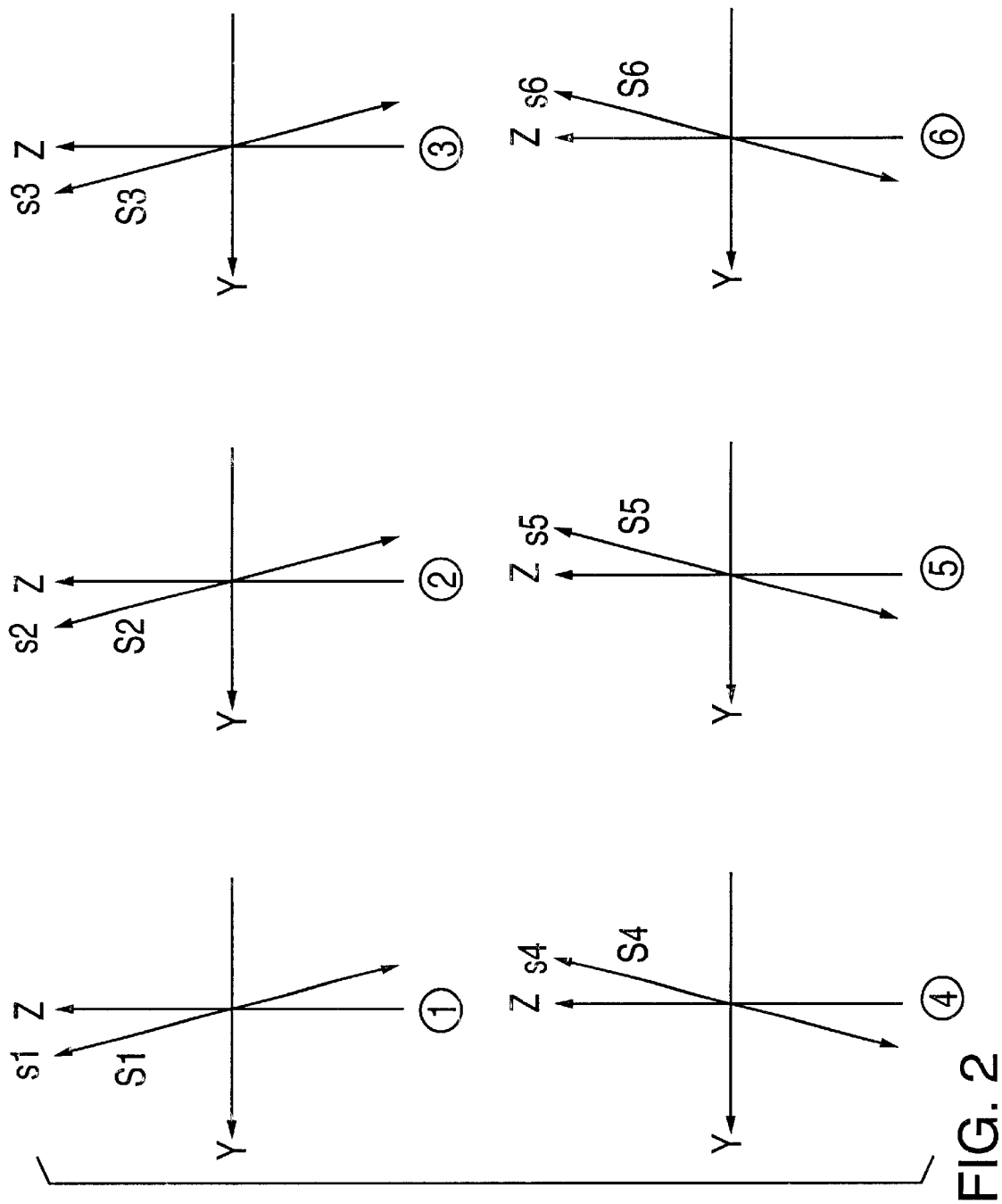
FIG. 2 is a diagram illustrating the polarization states of the light flux at various points in the optical path of the color projection apparatus of FIG. 1.

The polarization states of the light flux, as the light flux travels along the optical path of the FIG. -1 apparatus in the X axis direction toward the YZ plane at locations (1)–(6), is shown in FIG. 2.

The polarization-splitting part 40 of the PBS is disposed such that it is substantially parallel with the dichroic mirrors 41, 42. Thus, the incidence planes of the dichroic mirrors 41, 42 are parallel with the incidence plane of the polarization-splitting part 40. As a result, the light flux is polarized only in the s-direction at locations (1)–(3); there is no p-polarized light component in the light flux.

Therefore, even if the dichroic mirrors 41, 42 comprise a film that produces a phase difference between p-polarized light and s-polarized light, the resulting projected image quality does not suffer because the light flux has only s-polarized light. That is, the linearly polarized light flux generated by the PBS travels toward the quarter-wave plate 44 without encountering any change in the state of polarization. The light flux is then reflected by the reflecting mirror 43, and returns back to the dichroic mirror 42 after passing through the quarter-wave plate 44. Thus, the light ray passes twice through the quarter-wave plate 44. This means that the quarter-wave plate 44 acts as a half-wave plate. Therefore, the light flux is polarized as shown in FIG. 2, in which the polarization directions at the locations (3) and (4) in FIG. 1 are symmetric about the X axis.

The incidence planes of the dichroic mirrors 41, 42 and the incidence plane of the polarization-splitting part 40, on which the light flux is incident after being reflected by the reflecting mirror 43, are symmetric about the Z axis. Therefore, the polarization direction at locations (4)–(6) in FIG. 1 is coincident with the s-polarization direction of these incidence planes. Thus, the light flux has no p-polarized light component.

Because the linear polarization is kept in the same state, the light flux is reflected by the polarization-splitting part 40 of the PBS toward the light source. Accordingly, only a small amount of light flux is transmitted and discarded by the polarization-splitting part 40.

In the embodiment described above, the white illumination-light flux emitted from the light source consists only of p-polarized or s-polarized light after passing through the dichroic mirrors. Accordingly, the light flux is maintained in the same linearly polarized state without the need to employ special devices that control phase differences. Therefore, it is possible to project an ideal black image on the screen with a relatively simple projection apparatus. The number of dichroic mirrors disposed in the apparatus is not limited to the above-described example.

In the example described above, s-polarized light is generated by the PBS. However, the system may be constructed in a manner such that p-polarized light rather than s-polarized light is generated without changing the principle of operation.

Figure 3:
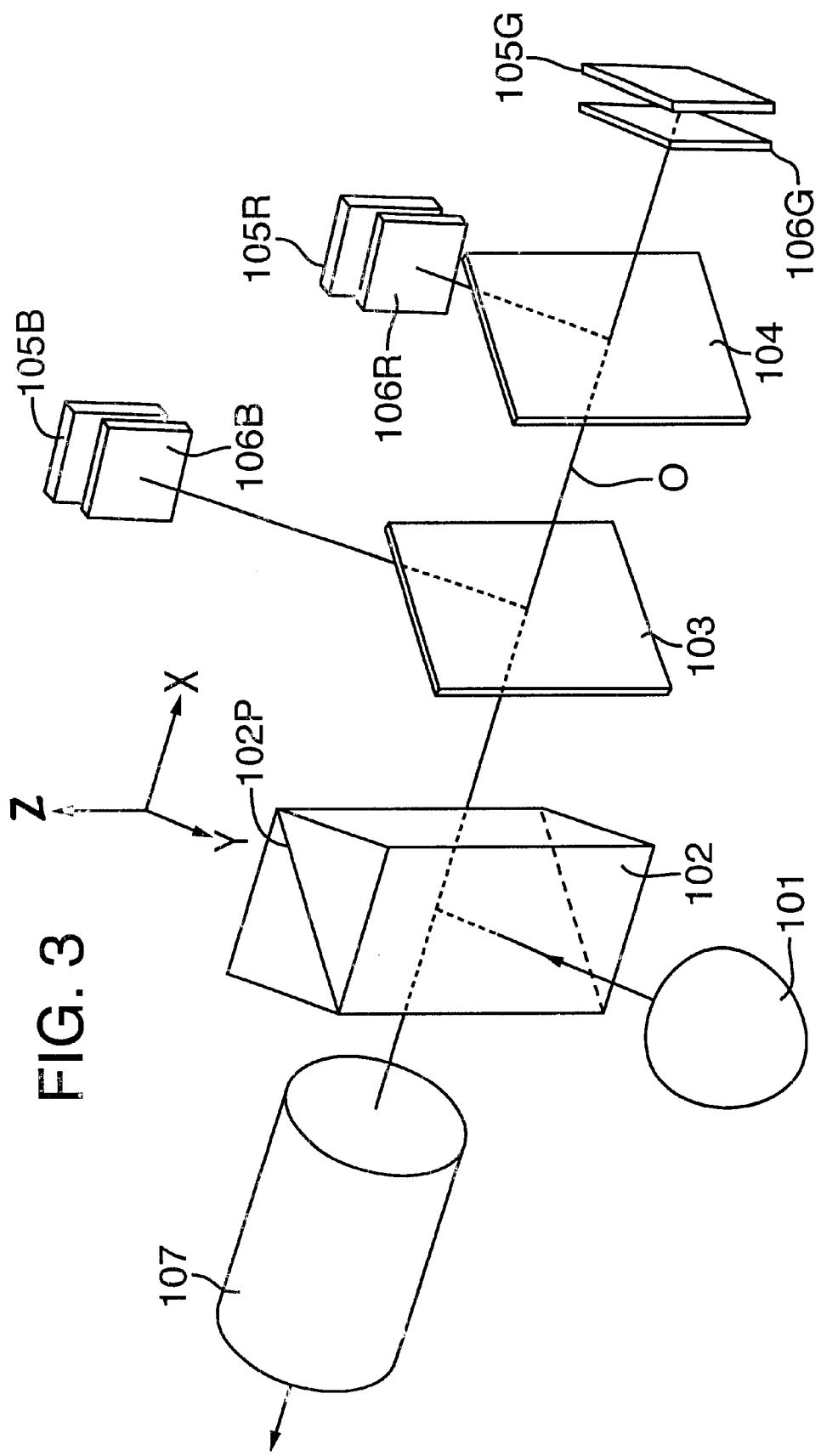
FIG. 3 is an optical diagram of a second example embodiment of the color projection apparatus of the present invention.

A first example embodiment of a color projection apparatus of the present invention is shown in FIG. 3. For convenience of description, the orthogonal X, Y, and Z axes are defined as shown in FIG. 3.

A white light-illumination flux is emitted in the -Y direction from a light source 101 comprising a lamp (not shown) and a concave mirror (not shown). The illumination-light flux passes through a collimator (not shown) operable to make parallel the rays comprising the illumination-light flux. The illumination-light flux then passes through an infrared-light rejection filter (not shown), an ultraviolet-light rejection filter (not shown), and is then incident on a polarizing beam splitter (PBS) 102.

The PBS 102 comprises two glass prisms in the form of right-angled isosceles triangles wherein the planes opposite to the respective right angles are bonded to each other by a dielectric multi-layer film that operates as a polarization-splitting plane 102P. The PBS 102 is positioned so that the polarization-splitting plane 102P is perpendicular to the YZ plane and at an angle of 45° relative to the X axis of the coordinate system defined above, and so that the light flux reflected by the polarization-splitting plane 102P travels in the X axis direction.

The illumination-light flux incident on the PBS 102 is split, at the polarization-splitting plane 102P, into p-polarized light and s-polarized light. The p-polarized light is transmitted by the polarization-splitting plane 102P in the Y direction and is discarded. The s-polarized light is reflected by the polarization-splitting plane 102P in the X axis direction.

The s-polarized light is then incident on a blue (B)-reflecting dichroic mirror 103. A surface of the B-reflecting dichroic mirror 103 is coated with an evaporated dichroic film so that the B-reflecting dichroic mirror reflects the blue light of the s-polarized light. The B-reflecting dichroic mirror 103 is disposed along the optical axis O so that the B-reflecting dichroic mirror 103 is substantially parallel with the polarization splitting plane 102P of the PBS 102.

The blue light of the s-polarized light reflected by the B-reflecting dichroic mirror 103 is incident on a B reflection-type liquid crystal light valve (LCLV) 105B via a quarter-wave plate 106B. The B LCLV 105B and quarter-wave plate 106B are, preferably, both disposed substantially parallel with the XZ plane so that the propagation axis is oriented in the X-axis direction.

The light flux including red and green light is transmitted by the B-reflecting dichroic mirror 103 to travel in the X-axis direction and be incident on the R-reflecting dichroic mirror 104. The R-reflecting dichroic mirror 104 is disposed along the optical axis O preferably substantially parallel with the polarization splitting plane 102P. The red light is reflected by the R-reflecting dichroic mirror 104 in the Y-axis direction so as to be incident on an R LCLV 105R after passing through a quarter-wave plate 106R. The quarter-wave plate 106R is disposed in a manner similar to quarter-wave plate 106B.

The green light is transmitted by the R-reflecting dichroic mirror 104 and travels in the X-axis direction toward an LCLV after traveling through a quarter-wave plate 106G. The quarter-wave plate 106G is, preferably, disposed substantially parallel with the YZ plane and in a manner such that the quarter-wave plate propagation axis is oriented in the Y-axis direction.

Each color light is reflected by the corresponding light valves to return through the corresponding quarter-wave plates. The green light passes through the dichroic mirror 104, while the red light component is reflected by the dichroic mirror 104. Thus the red light is combined with the green light and the combined light flux travels in the -X direction. The combined red and green light flux passes through the dichroic mirror 103 and is combined with the blue light reflected by the dichroic mirror 103. Thus, the three color lights are combined into a single light flux, that is incident on the PBS 102.

Whenever the light valves 105B, 105R, 105G perform no modulation on the R, G, B lights, the combined light flux incident on the PBS 102 is s-polarized. Thus, the combined s-polarized light flux is reflected (i.e., is analyzed) by the polarization-splitting plane 102P of the PBS 102.

The color projection apparatus described above operates in accordance with the general principle of the invention as described above with reference to FIG. 1 and FIG. 2.

The polarization-splitting plane 102P of the PBS and the B and R dichroic mirrors 103, 104 are, preferably, positioned substantially parallel with one another. Thus, the planes defined by the directions normal to these elements and the propagation directions are also substantially parallel with one another. As a result, when light fluxes are reflected by the light valves, without being subjected to modulation, the reflected light fluxes include only s-polarized light (i.e., the light fluxes do not change in polarization state). The light flux includes only s-polarized light with the same intensity as that of the incident illumination-light flux. Thus, an image is projected on a screen or other viewing surface without encountering a reduction in the image contrast due to a change in polarization state.

Figure 4:
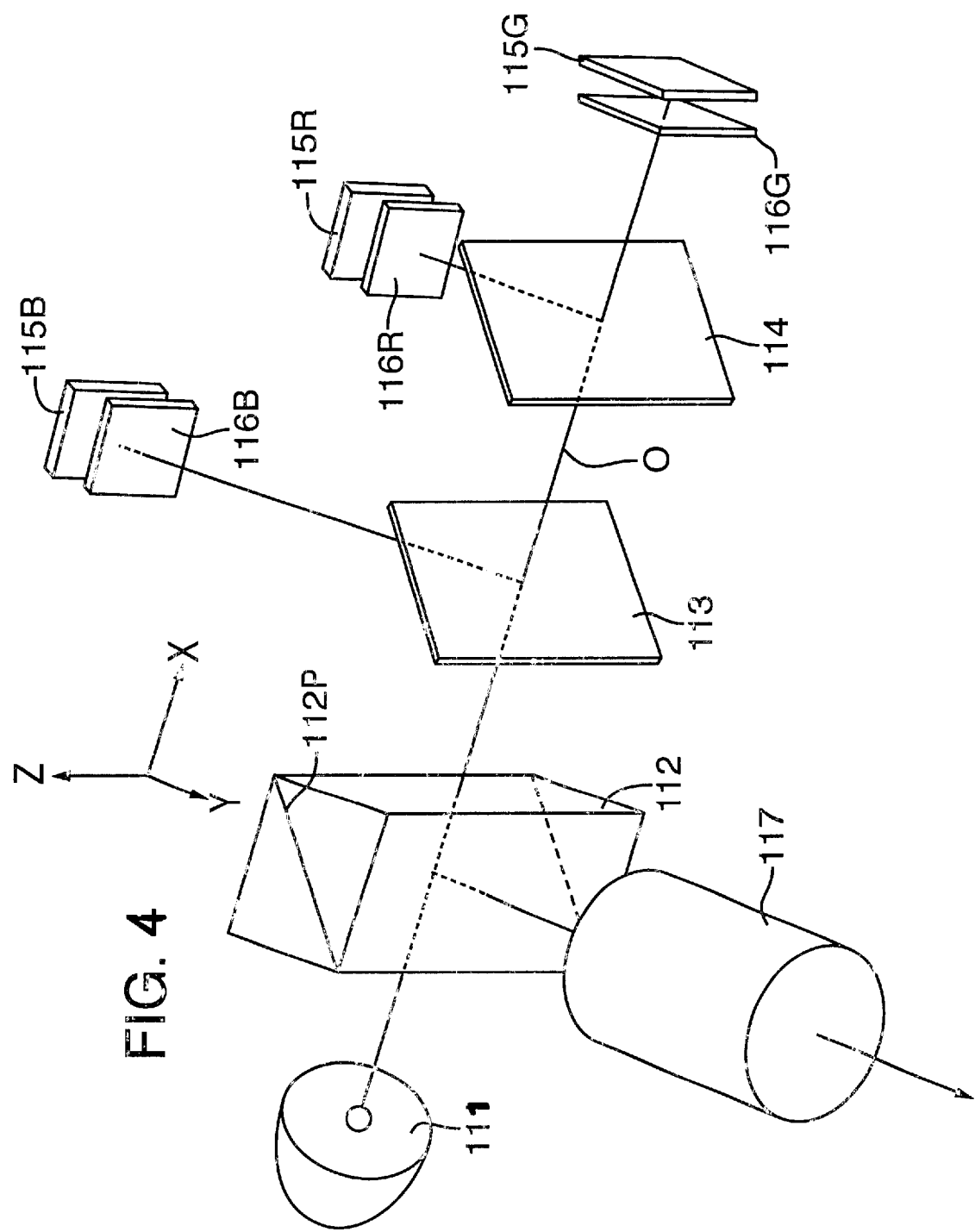
FIG. 4 is an optical diagram of a second example embodiment of the color projection apparatus of the present invention.
Figure 5:
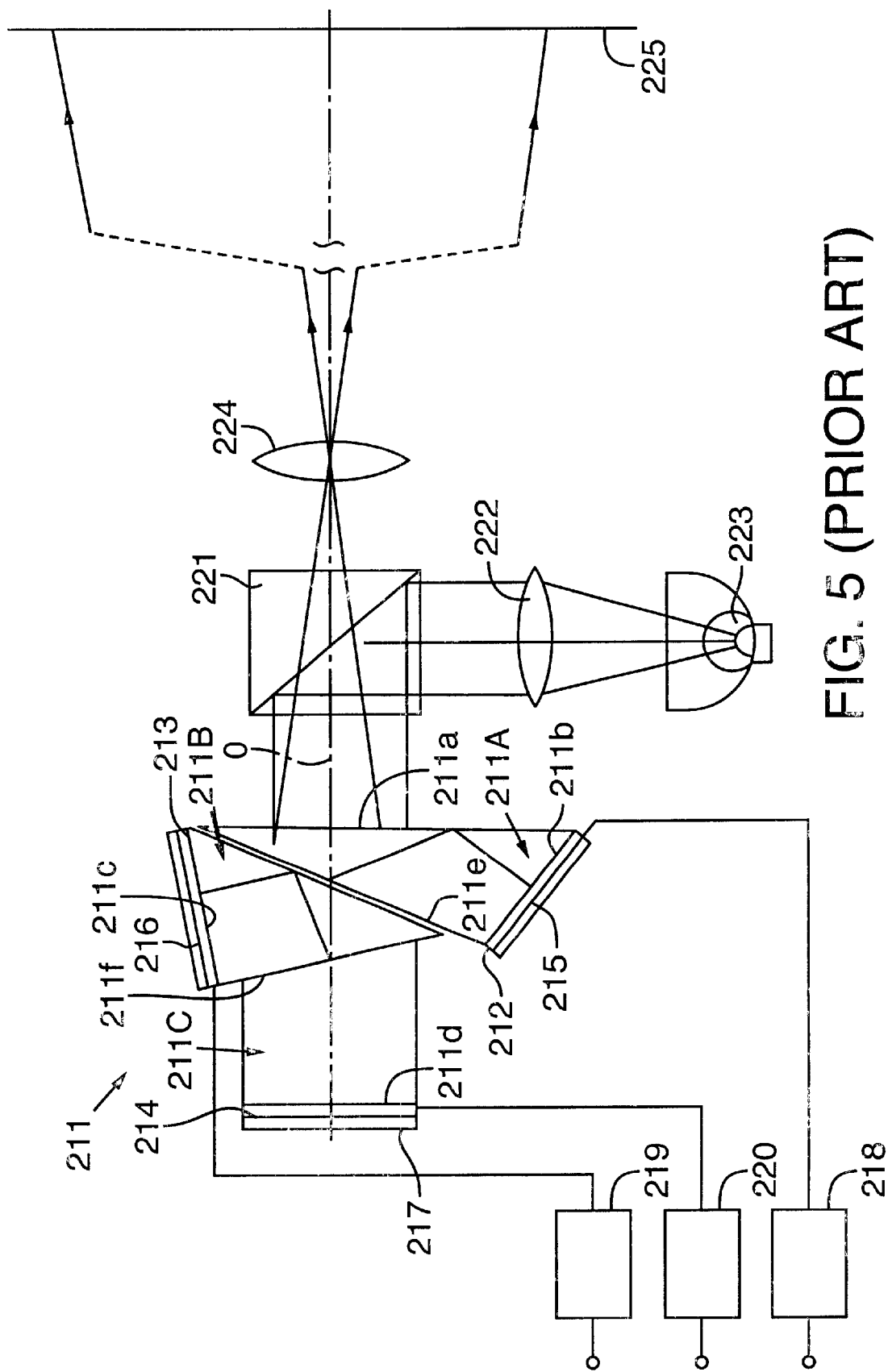
FIG. 5 is an optical diagram of a prior-art color projection device.
Figure 6:
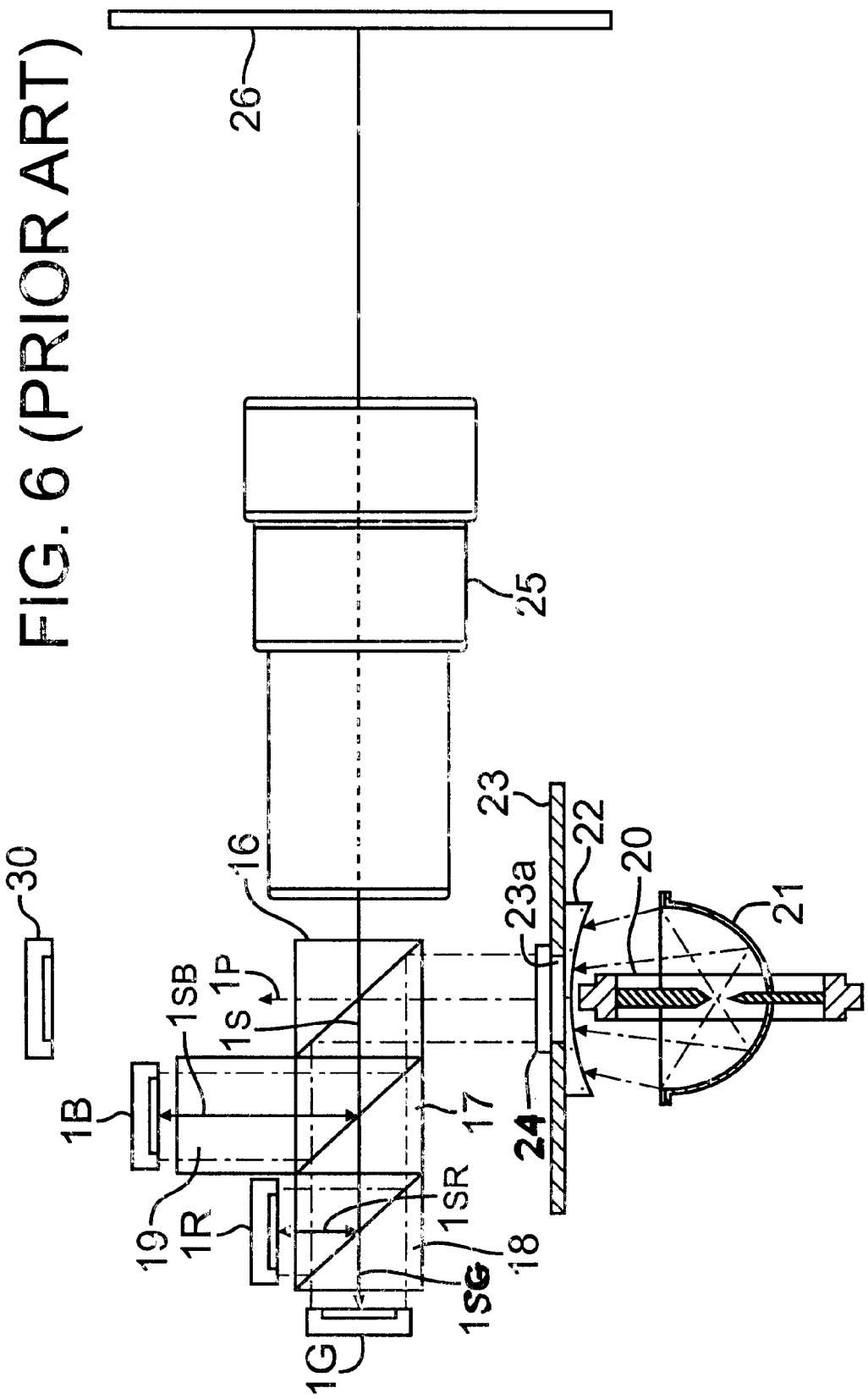
FIG. 6 is an optical diagram of another prior-art color projection device.

FIG. 4 illustrates a second example embodiment of the projection apparatus of the present invention. This embodiment differs from the first example embodiment illustrated in FIG. 3 in that the elements in the second example embodiment are arranged so a PBS splits a p-polarized light flux from an incident illumination-light flux, which p-polarized light is then incident on a dichroic mirror.

A white illumination-light flux is emitted from a light source 111 through a collimator lens (not shown), an ultraviolet-light rejection filter (not shown), and an infrared-ray rejection filter (not shown). The light flux then travels in the X axis direction so to be incident on a PBS 112.

S-polarized light emitted by the light source 111 is reflected by a polarization-splitting plane 112P of the PBS 112 and is discarded. P-polarization light is transmitted by the PBS 112 so as to be incident on a B-reflecting dichroic mirror 113 and an R-reflecting dichroic mirror 114.

The B-reflecting dichroic mirror 113 and the R-reflecting dichroic mirror 114 are disposed substantially parallel with the polarization-splitting plane 112P of the PBS 112. The P-polarized light is separated into B, R, and G light by the respective dichroic mirrors 113 and 114.

The separated color lights are incident on reflection-type light valves 115B, 215R, 115G, respectively, after passing through respective quarter-wave plates 116B, 116R, and 116G. The quarter-wave plates 116B, 116R, and 116G are disposed such that their propagation axes are oriented parallel with the Y axis. The respective color lights are reflected by the corresponding light valves.

The reflected color lights pass back through the respective quarter-wave plates 116B, 116R, and 116G and the three color lights are combined into a single light flux by the dichroic mirrors. The combined light flux is then analyzed by the polarization-splitting plane 112P of the PBS 112. Of the light flux entering the PBS 112, a reflected light flux is projected by a projection lens 117 onto a display surface (not shown) thereby forming an image on the surface.

In the second example embodiment, when no modulation is performed by the light valves 115R, 115G, 115B, the light flux returning to the PBS 112 includes on p-polarized light. Thus, it is possible to project a high-contrast black image onto a display surface, such as a screen. That is, a light flux can travel through the optical system, including the plurality of dichroic mirrors, without encountering a change in the state of polarization.

In the first and second example embodiments of the present invention, illustrated in FIGS. 3 and 4, the light fluxes are represented by corresponding optical axes O. In practice, however, the light flux incident on the PBS has a particular width at a particular incident angle. That is, the incident direction of the light flux is not limited to a direction parallel with the XY plane, but may be incident on the PBS from directions that are not parallel with the XY plane.

A third example embodiment of the color-projection apparatus comprises: (1) a polarizing beam splitter for splitting a light flux emitted from a light source; (2) a dichroic mirror for separating the first polarized light into green light and light containing both blue and red light; (3) a dichroic prism for separating light comprising both blue and red light into blue light and red light; and (4) reflection-type light valves for modulating the respective R, G, B color light fluxes produced by the dichroic mirror and the dichroic prism.

In the third example embodiment, the dichroic mirror is operable to: (1) substantially transmit or reflects s-polarized light having wavelengths less than a first transmission/reflection boundary wavelength ("first λ") that is near a boundary wavelength between green light and blue light (about 500 nm), (2) substantially transmit or reflect s-polarized light having wavelengths greater than a second transmission/reflection boundary wavelength ("second λ") that is near a boundary wavelength between green light and red light (about 590 nm), (3) substantially reflect or transmit s-polarized light having wavelengths in a wavelength range between the first λ and the second λ, (4) substantially transmit or reflect p-polarized light having wavelengths less than a third transmission/reflection boundary wavelength ("third λ") that is near the boundary wavelength between green light and blue light (about 500 nm), (5) substantially transmit or reflect p-polarized light having wavelengths greater than a fourth transmission/reflection boundary wavelength ("fourth λ") that is near the boundary wavelength between green light and red light (about 590 nm), and (6) reflect or transmit p-polarized light having wavelengths in a wavelength range of from about the third λ to about the fourth λ.

The dichroic prism of the third example embodiment is operable to: (1) substantially transmit or reflect s-polarized light having wavelengths less than a fifth transmission/reflection boundary wavelength ("fifth λ"), (2) substantially reflect or transmit s-polarized light having wavelengths greater than the fifth λ, (3) substantially transmit or reflect p-polarized light having wavelengths less than a sixth transmission/reflection boundary wavelength ("sixth λ"), and (4) substantially reflect or transmit p-polarized light having wavelengths greater than the sixth λ, wherein (5) the fifth λ and sixth λ are in a wavelength range of from about a wavelength near the first λ or the third λ to about a wavelength near the second λ or the fourth λ.

According to the third example embodiment, the dichroic mirror may possess either type of dichroism described below. That is, the dichroic mirror may possess a "first-mirror dichroism" characterized by: (1) substantially transmitting the s-polarized light having wavelengths less than the first λ, (2) substantially transmitting s-polarized light having wavelengths greater than the second λ, (3) substantially reflecting s-polarized light having wavelengths within a range of from about the first λ to about the second λ, (4) substantially transmitting p-polarized light having wavelengths smaller than the third λ, (5) substantially transmitting p-polarized light having wavelengths greater than the fourth λ, and (6) reflecting p-polarized light have wavelengths within a range of from about the third λ to about the fourth λ.

This "first-mirror dichroism" is known to persons skilled in the art as the "green-light reflection property."

Alternatively, the dichroic mirror may possess a "second-mirror dichroism" characterized by: (1) substantially reflecting s-polarized having wavelengths less than the first λ, (2) substantially reflecting s-polarized light having wavelengths greater than the second λ, (3) substantially transmitting s-polarized light having wavelengths within a range of from about the first λ to about the second λ, (4) substantially transmitting p-polarized light having wavelengths less than the third λ, (5) substantially reflecting p-polarized light having wavelengths greater than the fourth λ, and (6) transmitting p-polarized light having wavelengths within a range of from about the third λ to about the fourth λ.

This "second-mirror dichroism" is known to persons skilled in the art as the "green-light transmission property."

According to the third example embodiment, whichever type of dichroism the dichroic mirror possesses, the dichroic prism may possess either type of dichroism described below. That is to say, the dichroic prism may have a "first prism dichroism"of: (1) substantially transmitting s-polarized light having wavelengths less than the fifth λ, (2) substantially reflecting s-polarized light having wavelengths greater than the fifth λ, (3) substantially transmitting p-polarized light having wavelengths less than the sixth λ, and (4) substantially reflecting p-polarized light having wavelengths greater than the sixth λ, wherein the fifth λ and the sixth λ are existent within a wavelength range as described above.

The dichroic prism may possess a "second-prism dichroism " of (1substantially reflecting s-polarized light having wavelengths less than the fifth λ, (2) substantially transmitting s-polarized light having wavelengths greater than the fifth λ, (3) substantially reflecting p-polarized light having wavelengths less than the sixth λ, and (4) substantially transmitting p-polarized light having wavelengths greater than the sixth λ, wherein the fifth λ and the sixth λ are existent within a wavelength range as described above.

According to the third example embodiment of the present invention, the dichroic mirror has the advantage of providing a small difference in dichroism between the s-polarized light and the p-polarized light. The dichroic prism that exhibits a large difference in dichroism between the s-polarized light and the p-polarized light has the advantage of providing excellent image resolution. Accordingly, the combination of the dichroic mirror and the dichroic prism of the third embodiment of the present invention results in minimal light loss and improved color balance while image resolution deterioration is maintained at a minimum.

More particularly, according to the third example embodiment, green light contained in one of polarized light fluxes polarized by the PBS is first reflected or transmitted by a dichroic mirror having the "green-light reflection property" or the "green-light transmission property."

Light flux containing blue and red light, which is transmitted or reflected by the dichroic mirror, is then separated into red light and blue light by the dichroic prism. The dichroic prism possesses dichroism transmission/reflection boundary wavelengths (fifth transmission/reflection boundary wavelength and sixth transmission/boundary wavelength) substantially in the wavelength band of green light. As a result, green light is separated from and later combined with the blue light and red light by utilizing the dichroism of the dichroic mirror that exhibits a relatively small difference between the p-polarized light and the s-polarized light.

As discussed above, the dichroism of the dichroic prism exhibits a relatively larger difference between the p-polarized light and the s-polarized light. The wavelength range wherein the difference in dichroism increases significantly is substantially included in the wavelengths band of green light (about 500 nm to about 560 nm). Red light and blue light reflected or transmitted by the dichroic prism will, therefore, remain substantially unaffected by the difference in dichroism. Thus, the light loss is suppressed and, hence, decreases in amount of projected light are prevented and color balance is improved. Additionally, as discussed above, by substituting a dichroic prism for one of the two dichroic mirrors, deterioration of the image resolution is minimized.

A color projection apparatus according to the third example embodiment of the present invention is illustrated with reference to FIGS. 9 to 11(a)–11(j). . The mutually orthogonal X axis, Y axis, and Z axis are defined as illustrated in FIG. 9 (the same applies to FIGS. 12, 13, 14, and 16, discussed below).

Figure 9:
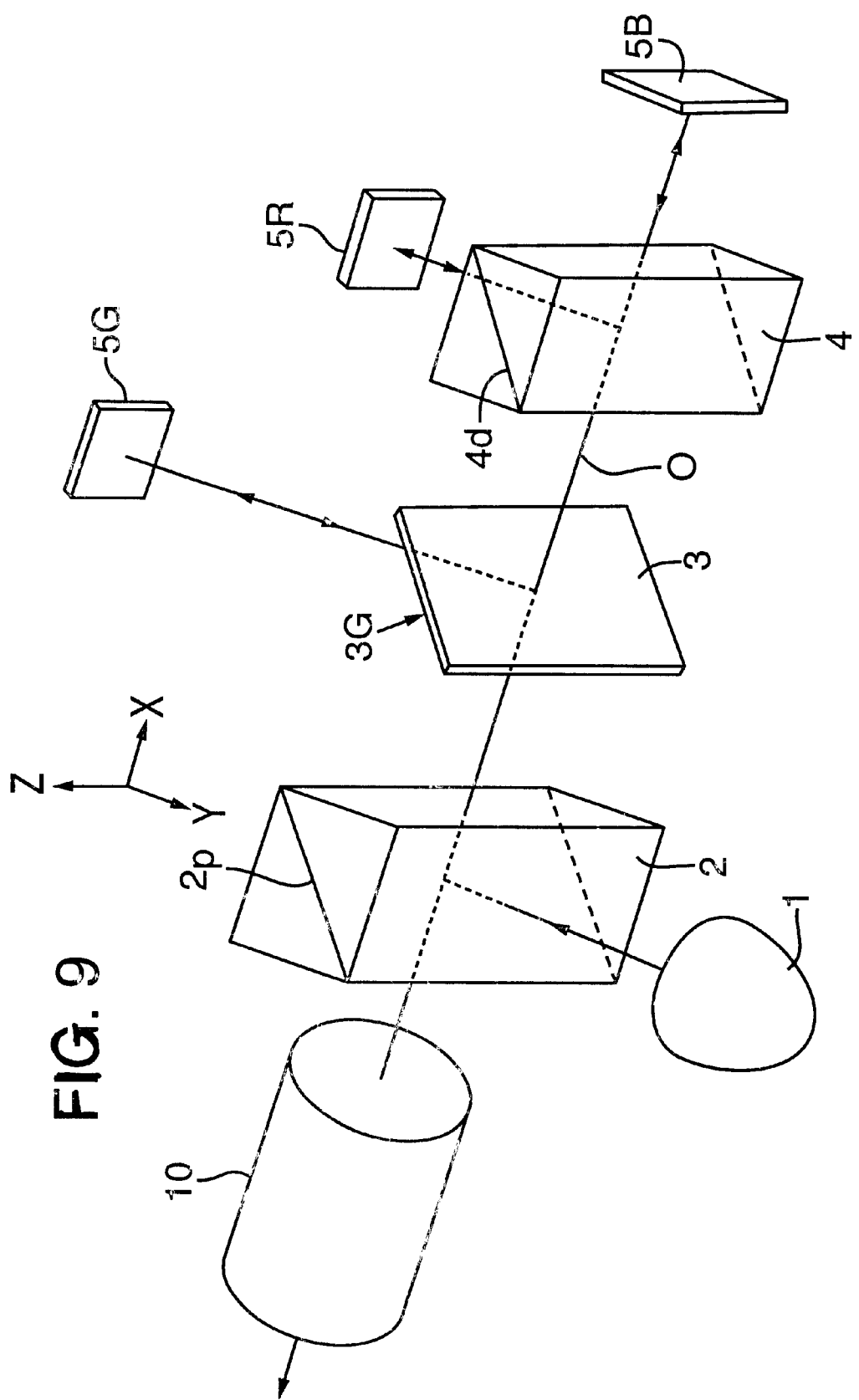
FIG. 9 is an optical diagram of a third example embodiment of the color projection apparatus of the present invention.

In the color projection apparatus shown in FIG. 9, a light source 1 comprises a lamp (not shown) and a concave mirror (not shown), such as an elliptic mirror disposed adjacent the lamp. White illumination light emanating from the light source 1 preferably passes through an infrared-light absorption filter (not shown), an ultraviolet-light absorption filter (not shown), and a collimator lens (not shown). The collimator lens makes rays of the light flux substantially parallel along the Y-axis.

The light flux is then directed to a PBS 2. The PBS 2 is, preferably, positioned so that one of its surfaces, coated with a polarizing/separating film 2p, is orthogonal to an XY plane, at an angle of about 45° with respect to the Y axis. Light flux incident on the PBS 2 is polarized and separated into p-polarized light (emitted in the Y-axis direction from the polarizing beam splitter 2 and discarded) and s-polarized light. The s-polarized light is reflected by the polarizing/separating film 2p and emitted from the PBS 2 in a direction along the X-axis.

The s-polarized light falls on a dichroic mirror 3. The dichroic mirror 3 comprises a glass plate having a first surface (incident surface) coated with a dichroic film. The dichroic mirror 3 is, preferably, positioned so that the dichroic film is parallel with the polarizing/separating film 2p of the PBS 2. In this embodiment, the dichroic mirror 3 possesses, fundamentally, dichroism such that green light is reflected while blue and red light is transmitted (i.e., the "green-light reflection property").

Green light is reflected by the dichroic mirror 3 and propagates in a direction along the Y-axis so as to be incident on a green light LCLV 5G. The light flux containing red and blue light passes through the dichroic mirror 3, and propagates in a direction along the X-axis so as to be incident on a dichroic prism 4.

The dichroic prism 4 comprises, for example, a dichroic film 4d sandwiched by two triangle-pole prisms. The dichroic prism 4 is positioned so that the dichroic film 4d is parallel with the polarizing/separating film 2p of the PBS 2 and with the dichroic film of the dichroic mirror 3. In this embodiment, the dichroic prism 4 possesses, fundamentally, dichroism such that red light is reflected and blue light is transmitted.

The reflected red light propagates in the Y-axis direction and is incident on a LCLV 5R. The blue light passes through the dichroic film 4dof the dichroic prism 4, propagates in a direction along the X-axis, and is incident on a LCLV 5B.

S-polarized light, polarized and separated by the PBS 2, is thus, separated into green light, red light, and blue light by a color-separation/combination optical system comprising, inter alia, the dichroic mirror 3 and dichroic prism 4.

The color lights of the s-polarized light flux incident on the LCLVs 5G, 5R, and 5B are modulated by the respective LCLVs. Modulated light fluxes of the color lights propagate in a direction opposite to the direction from which they were incident on the respective LCLVs, to return to the dichroic mirror 3 and dichroic prism 4. In this embodiment, preferably, electric writing-type reflection light valves are used for the LCLVs 5G, 5R, and 5B. The electric writing-type reflection light valve operates to change the direction of polarization of a reflected and emitted light flux component as electrically selected according to each color signal. Accordingly, the direction of polarization is changed relative to the direction of incident light. The electric writing-type valve may, alternatively, operate to retain the direction of polarization of a reflected and emitted light flux so as to make the direction of polarization thereof the same as the direction of polarization of the incident light flux. Light flux modulated accordingly to the color signals and emitted from the LCLVs 5G, 5R, and 5B, will contain the selected p-polarized light (signal light component) and unselected s-polarized light.

Modulated red light reflected and emitted from the LCLV 5R propagates in a direction along the Y-axis. The modulated red light flux falls back on the dichroic prism 4, is reflected by the dichroic film 4d, and propagates in a direction along the X-axis. Modulated blue light reflected and emitted from the LCLV 5B propagates in the X-axis direction, returns to the dichroic prism 4, is transmitted by the dichroic film 4d, and propagates in a direction along the X-axis.

The modulated red light and modulated blue light are combined by dichroic prism 4, and the resultant combined color light is emitted therefrom in the X-axis direction. The combined color light is transmitted by the dichroic mirror 3, and propagates along the X-axis direction. Modulated green light reflected and emitted from the LCLV 5G propagates in a direction along the Y-axis, returns to the dichroic mirror 3, is reflected by the dichroic mirror 3, and propagates in the X-axis direction. As a result, the modulated green light is combined with the combined modulated red light and the modulated blue light. Thus, three color light fluxes are combined.

The three-color combined light propagates in the X-axis direction and returns to the PBS 2. The p-polarized light (signal light) of the three-color combined light is transmitted by the polarizing/separating film 2p of the PBS 2, propagates in the X-axis direction, and is projected on a screen (not shown) by the projection lens 10. The s-polarized light of the three-color combined light is reflected by the polarizing/separating film 2p of the PBS 2, and is discarded.

Figure 7:
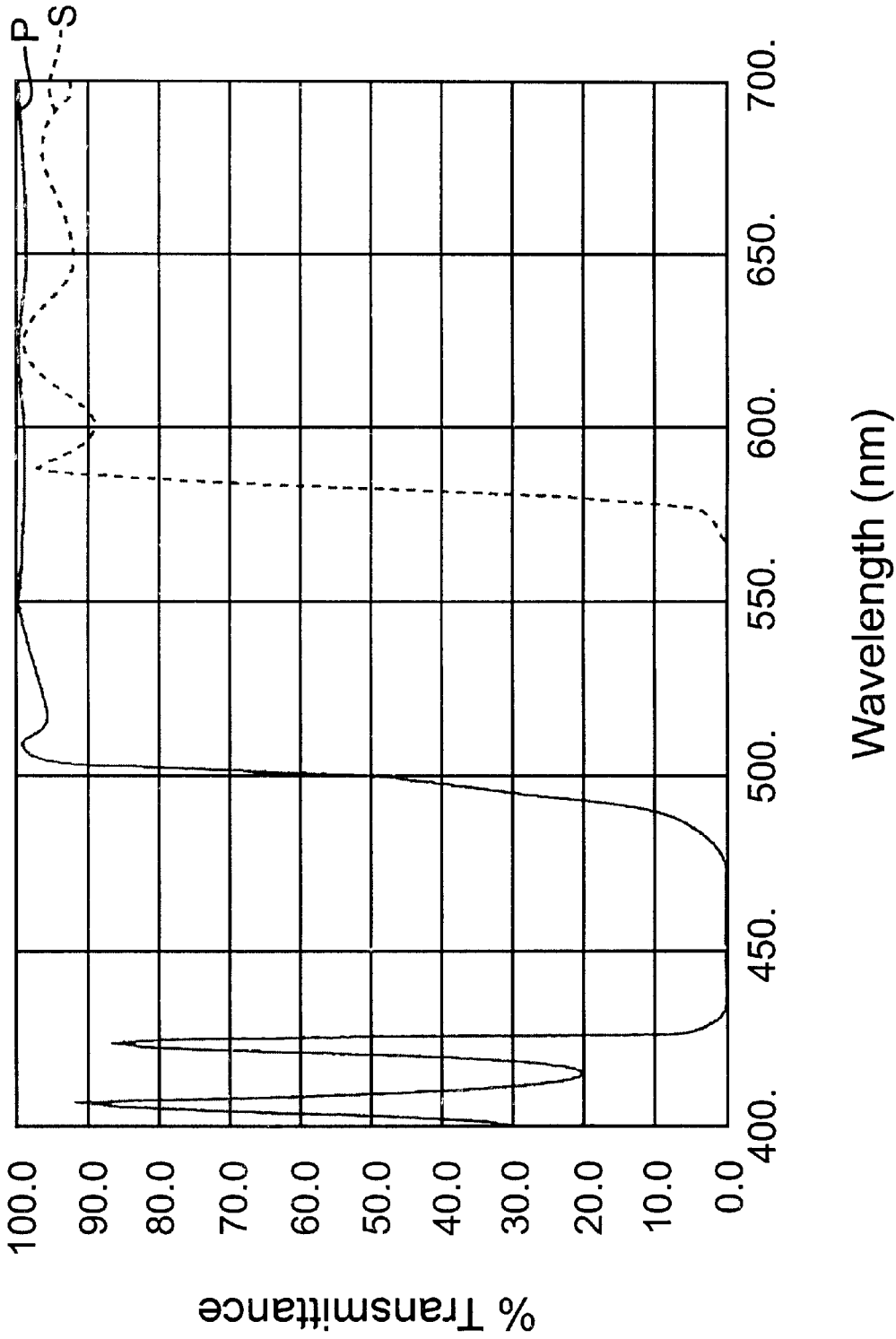
FIG. 7 illustrates the dichroism of the dichroic prism used in the devices of FIG. 5 or FIG. 6.
Figure 8:
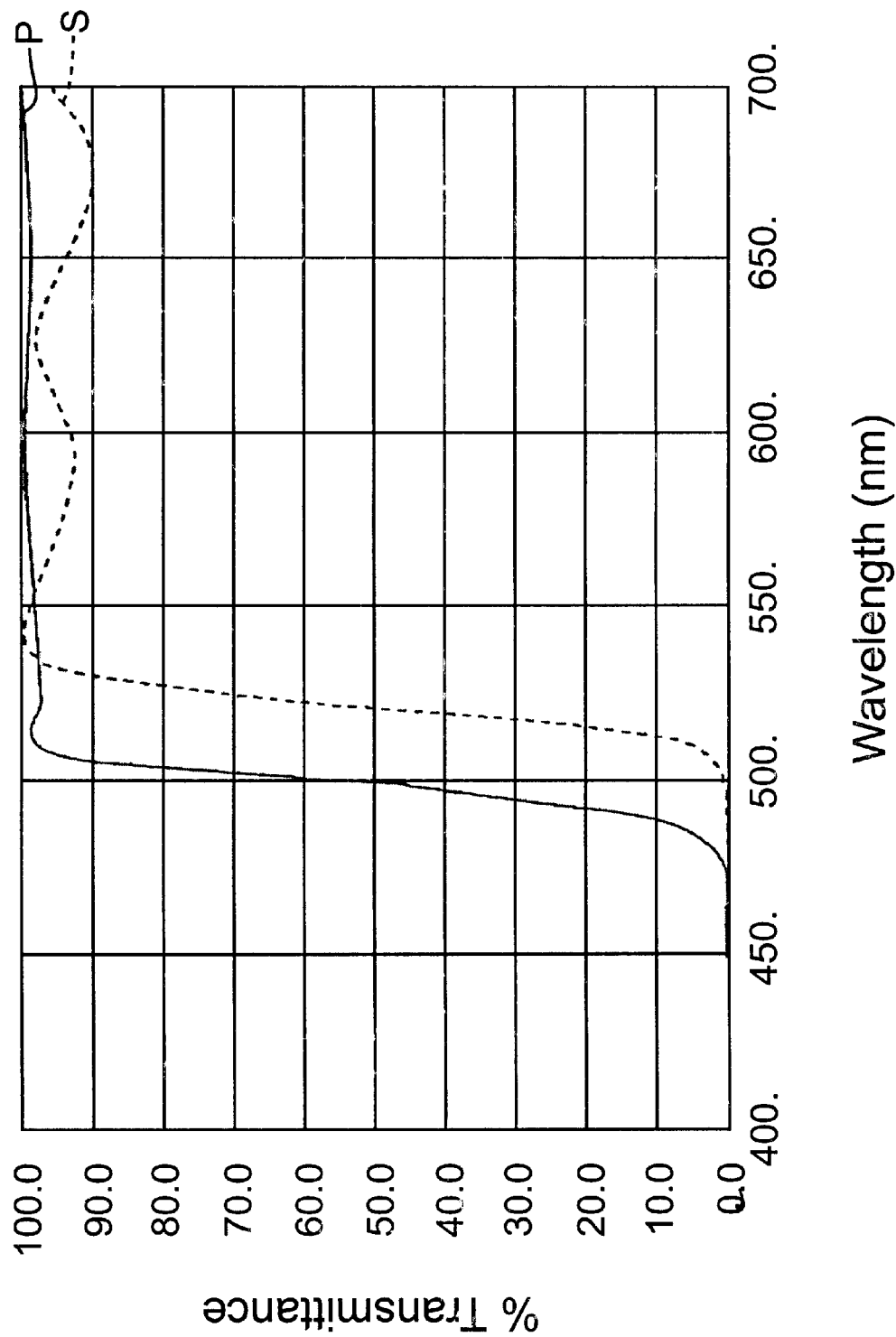
FIG. 8 illustrates the dichroism of a dichroic mirror.

To illustrate the dichroism of the dichroic mirror 3 and dichroic prism 4, and the color separation and combination achieved with such dichroism, reference is made to FIGS. 10(a) to 10(j). In FIGS. 10(a) and 10(b), the Y-axis indicates transmittance values and the X-axis indicates wavelengths. In FIGS. 10(a) and 10(b), the dashed lines indicate dichroism relative to s-polarized light, and solid lines indicate dichroism relative to p-polarized light. Although a curve expressing actual dichroism may exhibit reversal of transmission and reflection in relation to a given wavelength, as shown in FIG. 7, such part of the curve is omitted in FIGS. 10(a), 10(b), 11(a), and 11(b).

As shown in FIG. 10(a), the dichroic mirror 3 possesses the "first-mirror dichroism" as discussed above.

As apparent from FIG. 10(a), the dichroic mirror 3 exhibits only a small difference in dichroism between the s-polarized light and the p-polarized light. In this embodiment, the first λ (described above) is smaller than the third λ. The second λ is larger than the fourth λ. In other words, the reflected wavelength range of s-polarized light is wider than that of the p-polarized light.

FIG. 10(b) illustrates the dichroism of the dichroic prism 4. As shown in FIG. 10(b), the dichroic prism 4 possesses the "first-prism dichroism " discussed above.

The dichroic prism 4 exhibits a large difference in dichroism between the s-polarized light and the p-polarized light. In this embodiment, the sixth λ is considerably larger than the fifth λ. Additionally, the fifth λ is fractionally larger than the third λ. The sixth λ is also considerably larger than the first λ and slightly smaller than the fourth λ.

FIG. 10(c) shows relative wavelengths and the relationship between the amount of green light incident on the LCLV 5G after the green light was reflected from the dichroic mirror 3 (possessing the dichroism relative to s-polarized light illustrated in FIG. 10(a)).

FIG. 10(d) shows relative wavelengths and the relationship between the amount of blue light transmitted by the dichroic prism 4 (possessing dichroism relative to s-polarized light illustrated in FIG. 10(b)) after the light has been transmitted by the dichroic mirror 3 and has become incident on the LCLV 5B.

FIG. 10(e) shows relative wavelengths and the relationship between the amount of red light reflected by the dichroic prism 4 (having dichroism relative to the S-polarized light shown in FIG. 10(b)) after the red light has been transmitted by the dichroic mirror 3 and has become incident on the LCLV 5R.

FIG. 10(f) shows relative wavelengths and the relationship between the amount of green light reflected by the dichroic mirror 3 (having dichroism relative to p-polarized light shown in FIG. 10(a)) after the incident light flux is modulated into p-polarized light by the LCLV 5G and is reflected therefrom and has become incident on the PBS 2.

FIG. 10(g) shows relative wavelengths and the relationship between the amount of blue light transmitted by the dichroic prism 4 (having dichroism relative to the p-polarized light shown in FIG. 10(b)) after the incident light flux is modulated into p-polarized light by the LCLV 5B and reflected therefrom.

FIG. 10(h) shows relative wavelengths and the relationship between the amount of red light reflected by the dichroism prism 4 (having dichroism relative to the p-polarized light shown in FIG. 10(b)) after the incident light is modulated into p-polarized light by the LCLV 5R and reflected therefrom.

FIG. 10(i) shows relative wavelengths and the relationship between the amount of light falling on the dichroic mirror 3 as a result of combination by the dichroic prism 4. The light is a combination of the light flux illustrated in FIG. 10(g) and the light flux illustrated in FIG. 10(h).

FIG. 10(j) shows relative wavelength and the relationship between the amount of light flux (i.e., the three-color combined light) falling on the PBS as a result of combination by the dichroic mirror 3. The light is a combination of the light flux illustrated in FIG. 10(f) and the light flux illustrated in FIG. 10(i).

Figure 10:
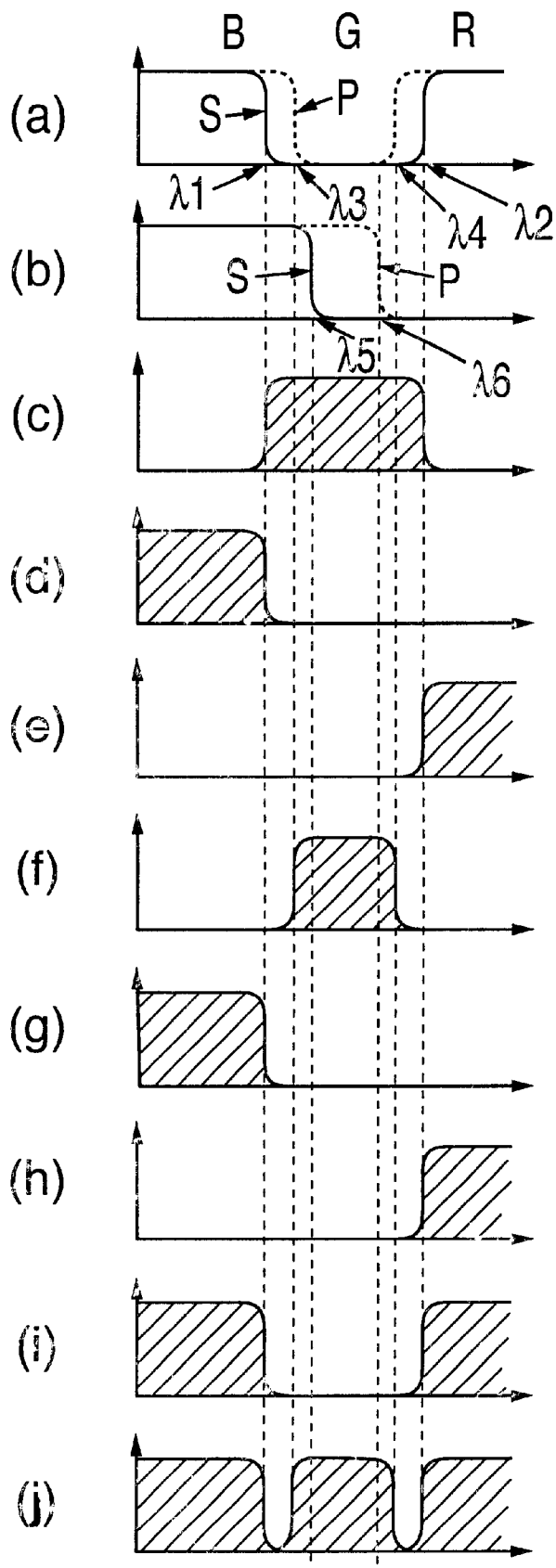
FIGS. 10(a)–10(j) illustrates the dichroism relevant to color-light separation and combination in the color-projection apparatus of FIG. 9.
Figure 11:
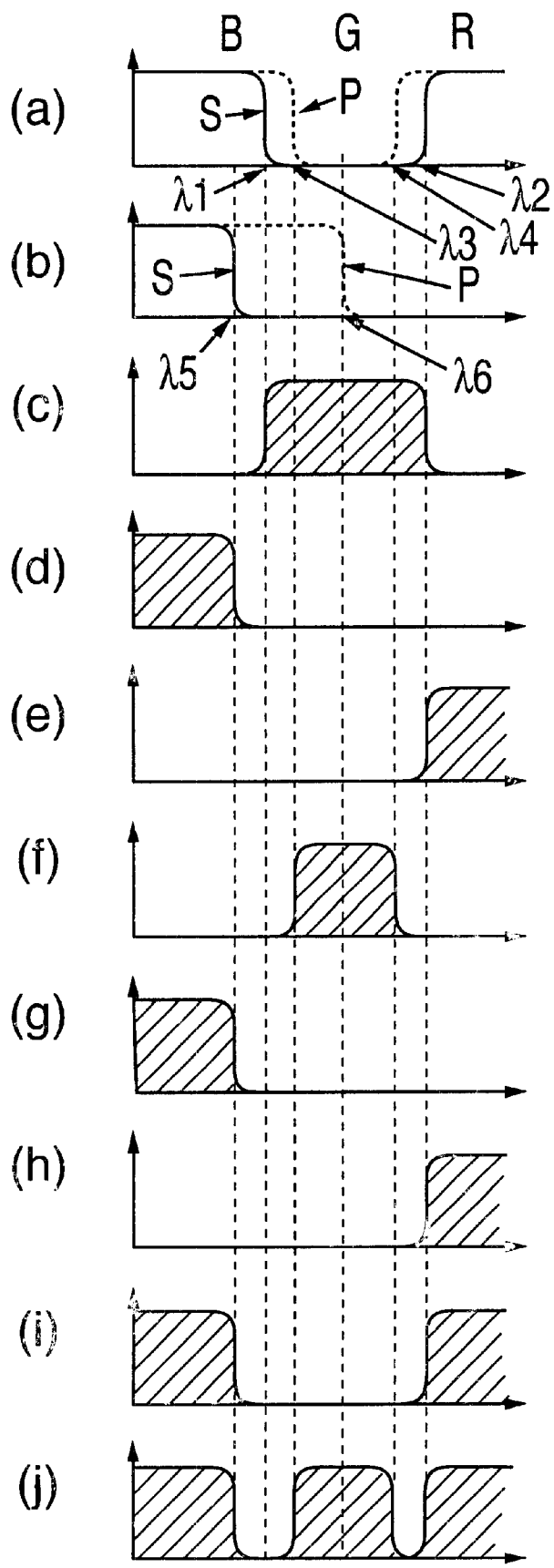
FIGS. 11(a)–11(j) further illustrate the dichroism relevant to color-light separation and combination in the color-projection apparatus of FIG. 9.

As shown in FIG. 10(b), although the dichroic prism 4 exhibits a large difference in dichroism between s-polarized light and p-polarized light, the three-color combined light is (as apparent from FIG. 10(j)) deprived of components having wavelengths in a wavelength range comparable to the small difference in dichroism of the dichroic mirror 3 between s-polarized light and p-polarized light shown in FIG. 10(a ) (i.e., a wavelength range of from about the first λ to about the third λ, and a wavelength range of from about the fourth λ to about the second λ).

The three-color combined light is transmitted by the PBS 2 and projected by the projection lens 10. Consequently, light of wavelengths substantially the same as the incident light flux are projected and, thus, light loss is suppressed.

In the foregoing example, as shown in FIGS. 10(a) and 10(b), the fifth λ and sixth λ are within a wavelength range of from about the third λ to about the fourth λ. Alternatively, the fifth λ may be within a wavelength range of from about the first λ to about the third λ. The sixth λ may be between the fourth λ and the second λ. Even in these cases, it is apparent that the same three-color combined light, as illustrated in FIG. 10(j), can be produced.

The dichroism of the dichroic mirror 3 and dichroic prism 4, and the color separation and combination are also illustrated with reference to FIGS. 11(a) to 11(j). In this example, the properties of the dichroic mirror 3 are identical to that of the dichroic mirror in FIGS. 10(a) to 10(j), but the properties of the dichroic prism 4 are different.

In FIGS. 11(a) through 11(j), the dashed line indicates dichroism relative to the s-polarized light, and the solid line indicates dichroism relative to the p-polarized light. The dichroism illustrated in FIG. 11(a) is identical to that shown in FIG. 10(a).

As shown in FIG. 11(b), the dichroic prism 4 has substantially the same dichroism as described above in relation to FIG. 10(b).

FIG. 11(b), however, unlike the example shown in FIG 10(b), the fifth λ is slightly smaller than the first λ. The sixth λ is intermediate the third λ and the fourth λ. That is to say, in FIG. 11(b), the dichroic prism 4 has the property that the fifth λ and the sixth λ are much smaller than those illustrated in FIG. 10(b).

FIGS. 11(c) to 11(j) are comparable to FIGS. 10(c) to 10(j), respectively. As seen from FIG. 11(j), since the fifth λ is smaller than the first λ, the wavelength range of blue light contained in the three-color combined light is narrower than that illustrated in FIG. 10(j). However, when the fifth λ is equal to a wavelength near the first λ, the shift of the fifth λ from the first λ is small. Accordingly, light loss is suppressed compared with that of a prior-art color-projection device.

In FIGS. 11(a) and 11(b), the fifth λ is less than the first λ. When the sixth λ is greater than the second λ, the wavelength band of red light contained in the three-color combined light flux becomes narrower for the same reason. Even in this case, if the sixth λ is at a wavelength near the second λ, the shift of the sixth λ from the second λ is so small that light loss is suppressed compared with a prior-art color-projection device.

As mentioned above, according to this example embodiment, although the dichroic prism 4 has a larger difference in dichroism between s-polarized light and p-polarized light, light loss is suppressed. Additionally, because a dichroic prism 4 is substituted for one of the dichroic mirrors, image-resolution deterioration is minimized.

According to this example embodiment, the dichroic mirror 3 (that may add to resolution deterioration but has the advantage of exhibiting only a small difference in dichroism between s-polarized light and p-polarized light) and the dichroic prism 4 (that exhibits a large difference in dichroism between s-polarized light and p-polarized light but has the advantage of minimizing image-resolution deterioration) are used advantageously in combination. Consequently, light loss is suppressed, decreases in the amount of projected light are prevented, and color balance is improved while deterioration of the resolution of a projected image is minimized.

Moreover, the dichroic film 4d of the dichroic prism 4 is fundamentally intended to separate red light and blue light. For reflecting red light alone and transmitting blue light alone or transmitting red light alone and reflecting blue light alone, as mentioned above, it is unnecessary to set boundary wavelengths between red light and green light and between green light and blue light as transmission/reflection boundary wavelengths. The transmission/reflection boundary wavelengths of s-polarized light and p-polarized light should merely be set to be within the wavelength band of green light and/or within a nearby wavelength range. This facilitates manufacture of the dichroic prism 4.

According to a fourth example embodiment of the present invention, a color projection apparatus of the present invention can further include a first trimming filter interposed between the dichroic prism and the corresponding LCLV. The first trimming filter operates to eliminate blue light, which is separated by and emitted from the dichroic prism, having wavelengths near the wavelength band of green light.

A second trimming filter can be interposed between the dichroic prism and third reflection light valve. The second trimming filter operates to eliminate red light, which is separated by and emitted from the dichroic prism, having wavelengths near the wavelength band of green light.

When a dichroic film is used for color separation, the relationship of the transmittance values or reflective values with the wavelengths is expressed as a characteristic curve fin which the rise or fall, relative to a wavelength near a transmission/reflection boundary wavelength, is moderate. That is, the rise and fall are not sufficiently sharp to be perpendicular to the axis of the wavelengths. For this reason, the color purity of the separated light is lowered by the color-separation process.

Accordingly, in the fourth example embodiment, the first trimming filter eliminates the blue light as described above and the second trimming filter eliminates the red light as described above. Consequently, the color purity of a projected image is improved.

Figure 12:
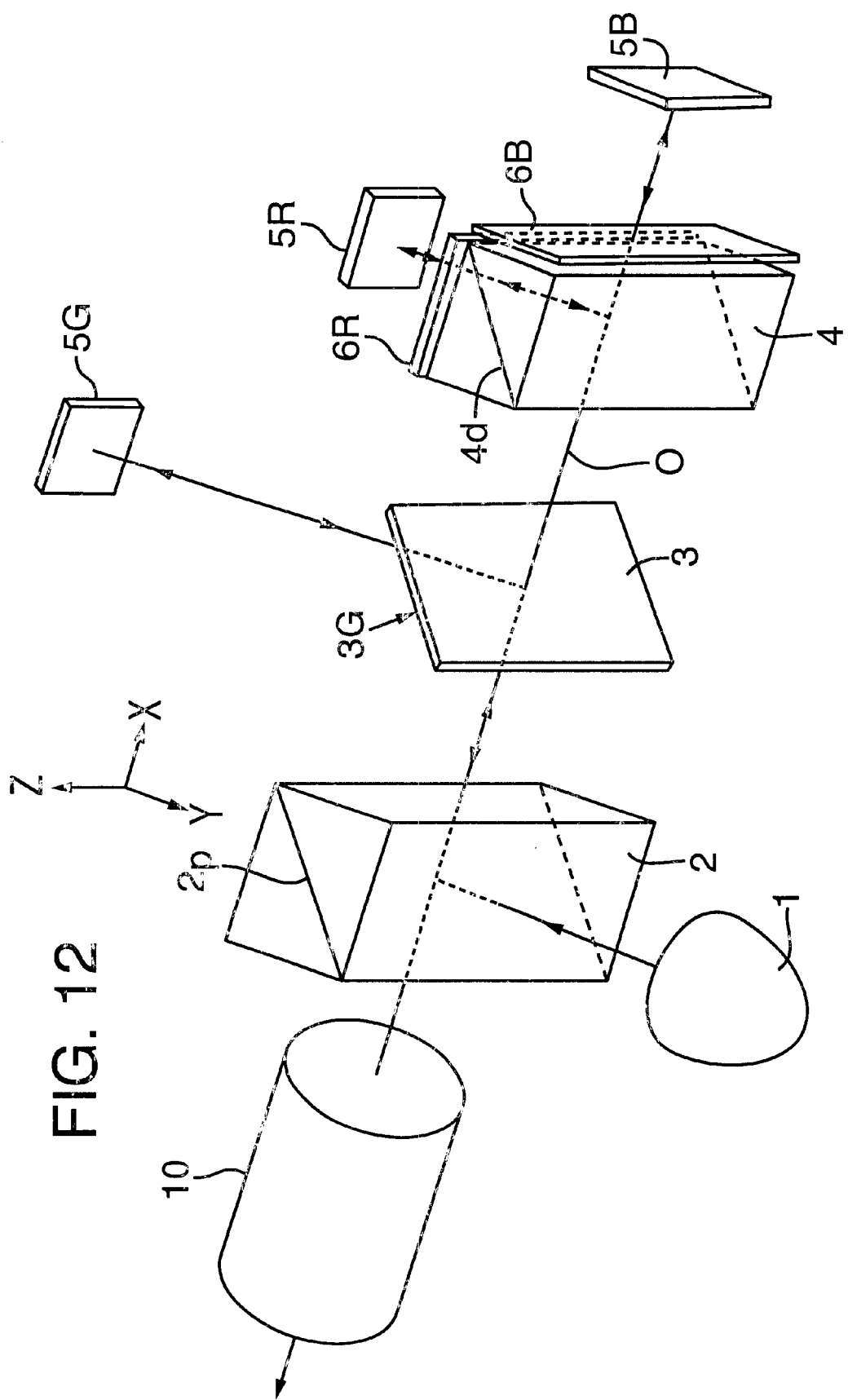
FIG. 12 is an optical diagram of a fourth embodied of the color projection apparatus of the present invention.

The fourth embodiment of the present invention is shown in FIG. 12. In FIG. 12, the same reference numerals are assigned to features identical to or comparable to those in FIG. 9. A repeat description of such elements is omitted.

A difference between this example embodiment and the third example embodiment shown in FIG. 9 is that the FIG. 12 embodiment includes a red-light trimming filter 6R and a blue-light trimming filter 6B. The trimming filters 6R, 6B are disposed near surfaces of the dichroic prism 4 through which red light and blue light separated by the dichroic prism 4 are respectively emitted.

In this example embodiment, a short-wave cutoff filter is used as the red-light trimming filter 6R, and a long-wave cutoff filter is used as the blue-light trimming filter 6B. Normally, when the dichroic films of the dichroic mirror 3 and dichroic prism 4 are used for color separation, the relationship of transmittance values or reflectance values to wavelengths is expressed as a curve (FIGS. 10(a)–10(j) and 11(a)–11(j)) whose maxima and minima relative to a wavelength near each transmission/reflection boundary wavelength are not sharp (that is, are not perpendicular to the axis of wavelengths) but rather are moderate. In other words, the curves overlap between adjoining wavelength ranges of colors. This can lead to a decrease in color purity of the separated colors.

According to this example embodiment, the blue-light trimming filter 6B eliminates a small amount of blue light, emitted from the dichroic prism 4, having wavelengths near a wavelength band of green light. The red-light trimming filter 6R eliminates a small amount of red light, emitted from the dichroic prism 4, having wavelengths near a wavelength range of green light. This example embodiment can therefore provide the same advantage as the third example embodiment. In addition, the color purity of a projected image is improved.

The trimming filters 6R and 6B are preferably, as shown in FIG. 12, oriented perpendicularly to the optical axis O. The trimming filters 6R and 6B do not significantly add to the size of the projection apparatus.

According to a fifth example embodiment of the present invention, the polarizing/separating film of the PBS, the dichroic film of the dichroic mirror, and the dichroic film of the dichroic prism are disposed substantially parallel with one another.

Accordingly, with the films arranged substantially parallel with one another, the directions of the p-polarization and the directions of the s-polarization defined by the films are substantially consistent with one another. Consequently, light flux combined and redirected to the PBS includes only an insignificant amount of light polarized in an undesirable state. This leads to improved contrast of the projected image.

According to a sixth example embodiment of the present invention (FIG. 13), a color projection apparatus further includes quarter-wave plates. A quarter-wave plate 7G is located between the dichroic mirror 3G and its corresponding LCLV 5G. Quarter-wave plates 7R, 7G are also located between the dichroic prism and its corresponding LCLVs 5R, 5B. The quarter-wave plates are, preferably, disposed substantially perpendicular to the optical axis O. Additionally, the axes of advancement or axes of retardation of the quarter-wave plates are, preferably, substantially contained on planes normal to the dichroic films of the dichroic mirror 3 and dichroic prism 4 and with the optical axis O.

When the quarter-wave plates 7G, 7R, 7B are arranged as described, light flux combined and directed to the PBS 2 contains no undesirable polarized light. In other words, light fluxes incident on the PBS contain light whose propagation direction is different between: (1) when the light flux emanates from the PBS, the dichroic mirror 3, the dichroic prism 4, and then falls on the respective LCLV, and (2) when the light flux is reflected by the LCLV back through the dichroic mirror 3 and the dichroic prism 4. Consequently, the p-polarization and the s-polarization directions defined by the dichroic films 2p, 3G, 4d, prior to polarization-phase change of the light flux by the LCLV, are different from the p-polarization and s-polarization directions defined by the films when the light flux is reflected by the LCLVs and returned to the PBS 2.

Even if the films 2p, 3G, 4d are arranged substantially parallel with one another, unless the quarter-wave plates 7G, 7R, 7B are included, light fluxes returned to the PBS may contain undesirable polarized light. If the light flux incident on the PBS passes through the quarter-wave plates twice (i.e., before the light falls on the LCLV after passing through the films and before the light passes through the films after being reflected by the LCLV), the quarter-wave plates 7G, 7R, 7B operate as half-wave plates. The plane of polarization of the light is rotated, whereby the difference is compensated for. Consequently, light returning to the PBS contains no undesirable polarized light components, and the contrast of a projected image improves.

Figure 13:
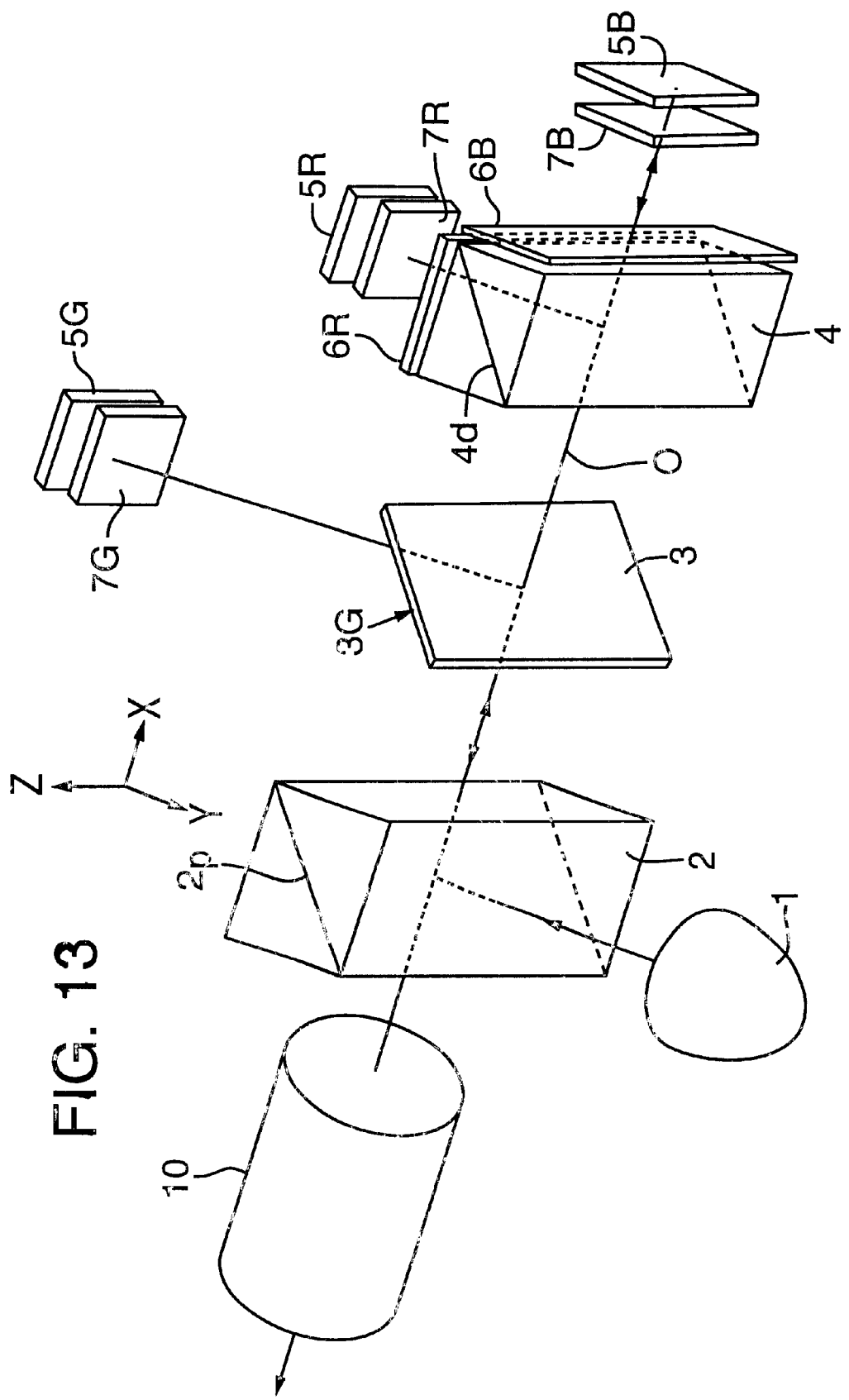
FIG. 13 is an optical diagram of a sixth example embodiment of the color projection apparatus of the present invention.
Figure 14:
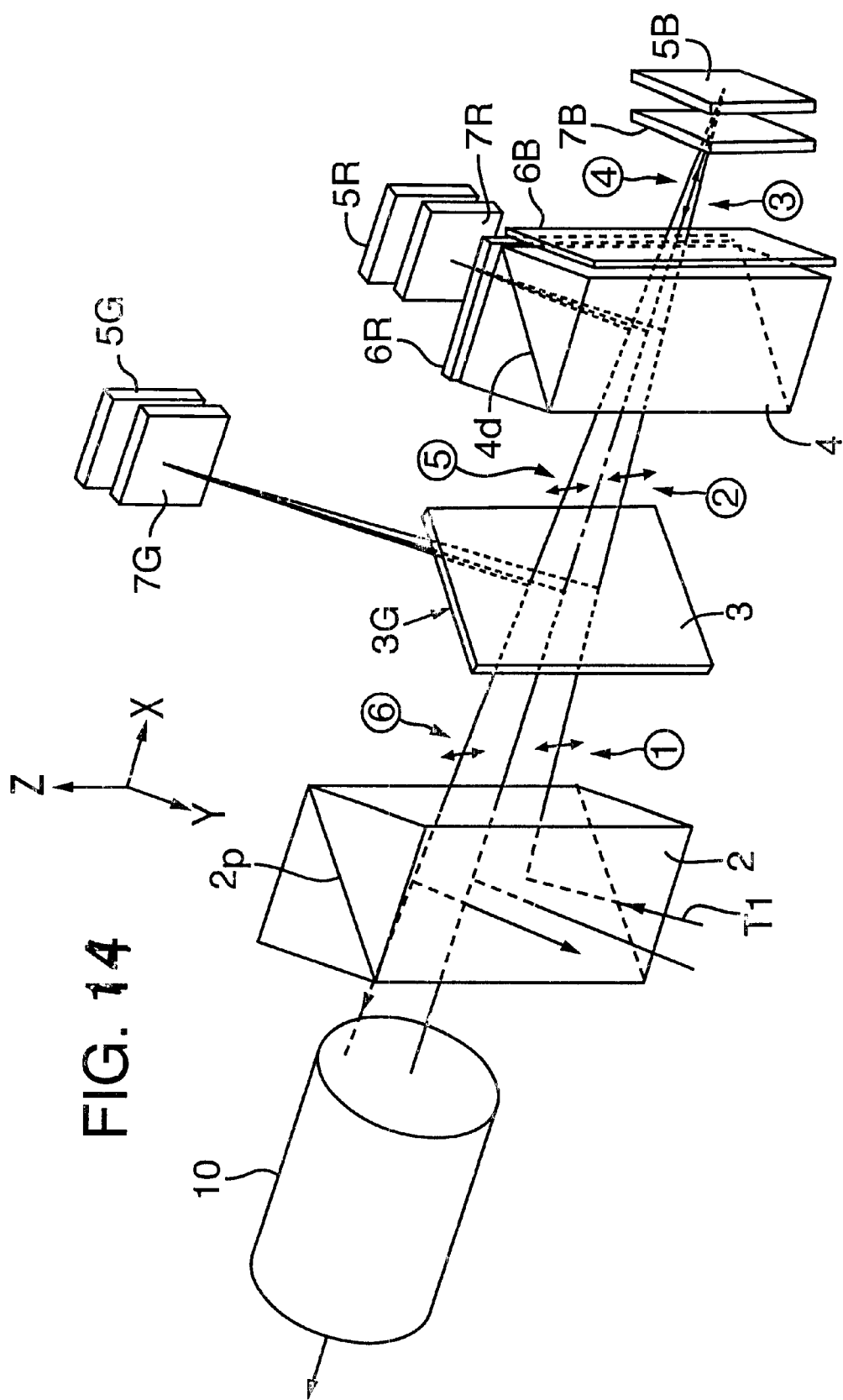
FIG. 14 is an optical diagram of the sixth example embodiment showing the functions of the quarter-wave plates.
Figure 15:
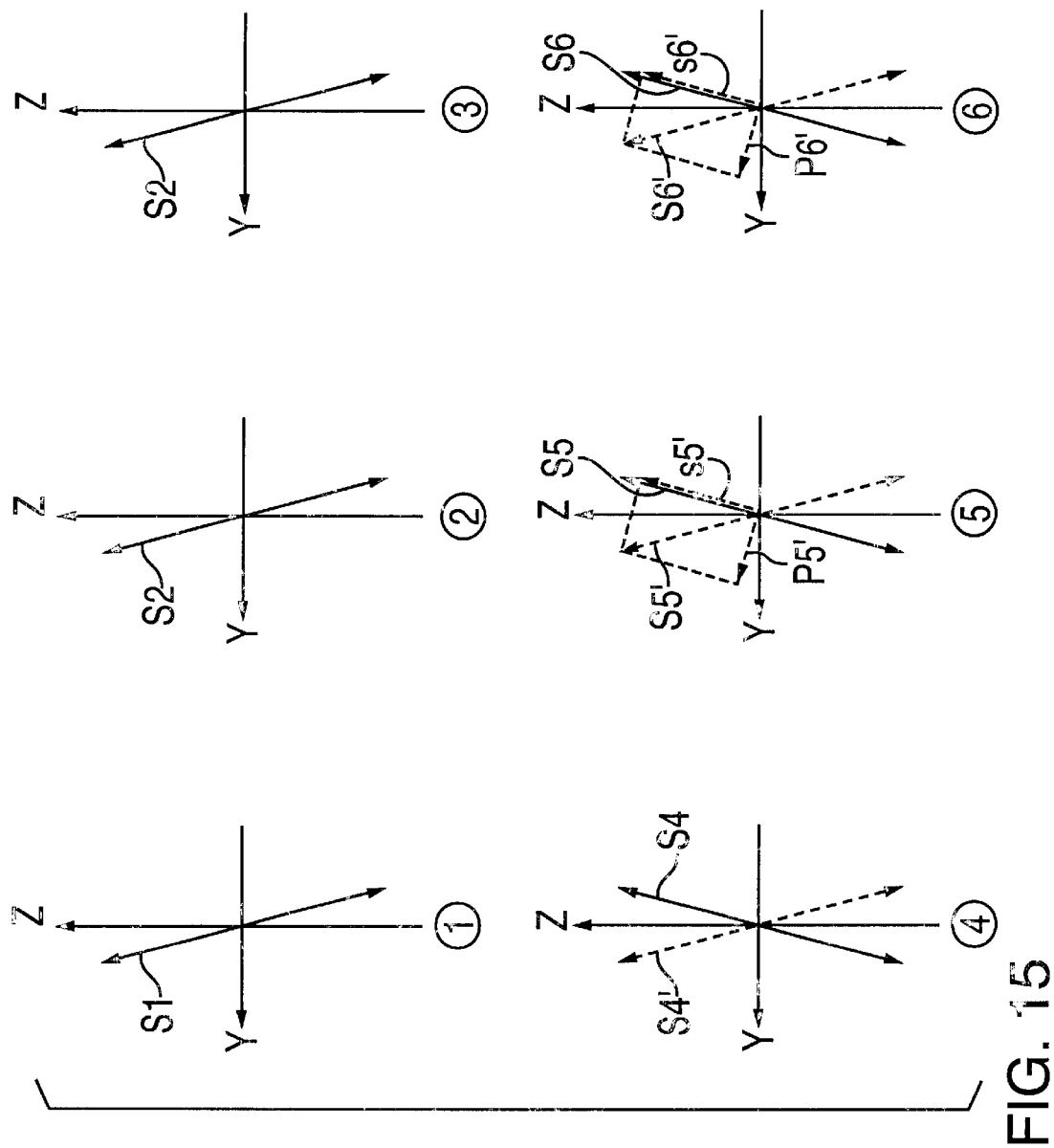
FIGS. 15(1)–15(6) are diagrams illustrating polarized states of the light paths shown in FIG. 14.

A color projection apparatus in accordance with the sixth example embodiment of the present invention is shown in FIGS. 13–15. FIG. 14 illustrates the functions of the quarter-wave plates 7R, 7G, and 7B, showing light fluxes in relation to the configuration shown in FIG. 13. FIGS. 15(1) to 15(6) are diagrams showing polarized states on the light paths shown in FIG. 13. In FIGS. 13 and 14, the same reference numerals are assigned to features that are identical to those in FIG. 12.

A difference in this example embodiment from the example embodiment shown in FIG. 12 is that the quarter-wave plates 7R, 7G, and 7B are placed in front of the LCLVs 5R, 5G, and 5B in the sixth example embodiment. The quarter-wave plates 7R and 7G are placed such that the axes of advancement thereof lie along the X-axis direction, while the quarter-wave plate 7B is placed such that the axis of advancement thereof lies along the Y-axis direction. In short, the quarter-wave plates 7R, 7G, and 7B are arranged in such a way that the axes of advancement or axes of retardation are contained on planes defined by lines normal to the dichroic films of the dichroic mirror 3 and dichroic prism 4, and with the optical axis O.

White illumination-light fluxes emitted from the light source 1 do not all propagate along the optical axis O, but propagate as a given angle with respect to the optical axis. The illumination-light flux then falls on the PBS 2. One of the rays of the light flux is shown as a ray T1 in FIG. 14.

The ray T1, incident on the PBS 2, is polarized and separated by the polarizing/separating film 2p of the PBS 2. A resultant S-polarized ray propagates at a given angle with respect to the optical axis O and is incident on the dichroic mirror 3 and dichroic prism 4. Only a light ray incident on the light value 5B, that is, a blue light component, is discussed herein.

Blue light transmitted by the dichroic mirror 3 is transmitted by the dichroic prism 4, passed through the quarter-wave plate 7B, and is reflected by the LCLV 5B. The light is then transmitted by the dichroic prism 4 and dichroic mirror 3, and is incident on the PBS 2.

FIG. 15 shows the polarized states of the ray T1 on light paths (1) to (6) in FIG. 14, wherein the polarized states are states on a YZ plane viewed along the X-axis direction. The light ray T1, reflected by the PBS 2, is s-polarized light that vibrates in a direction S1 (FIG. 15(1)), and slightly tilts against the Z axis. This is because the direction S1 is determined with respect to the direction normal to the polarizing/separating film 2p of the PBS 2 and the direction in which the ray T1 propagates.

Since the dichroic film of the dichroic mirror 3 and the polarizing/separating film 2p of the PBS 2 are parallel with each other, when polarized light is transmitted by the dichroic mirror 3, the polarized light passes through it while remaining s-polarized relative even to the dichroic mirror 3. This polarization is expressed in FIG. 15(2). The same applies to the ray T1 transmitted by the dichroic prism 4. The ray T1 passes through the dichroic film of the dichroic prism while remaining s-polarized. The direction of the s-polarization is, as shown in FIG. 15(3), identical to those shown in FIGS. 15(1) and 15(2). The ray T1 on the light path (3) is transmitted by the quarter-wave plate 7B whose axis of advancement is along the Y-axis direction. The ray T1 is reflected by the LCLV 5B, and then transmitted by the quarter-wave plate 7B. The ray T1 is transmitted by the quarter-wave plate 7B twice.

When the direction of polarization is not changed by the LCLV 5B, the direction in which polarized light vibrates becomes opposite to that expressed in FIGS. 15(1) to 15(3) with respect to the Z axis and tilts by the same angle with respect to the Z axis as indicated with S4 in FIG. 15(4). The direction is perpendicular to a plane defined with the propagation direction of the ray reflected from the LCLV 5B and normal to the dichroic film of the dichroic prism 4 (that is, the direction of s-polarization of the reflected light flux caused by the dichroic prism 4), and the direction S4 shown in FIG. 15(4).

Assuming that the quarter-wave plate 7B is not included, the direction of polarization on the optical path (4) in FIG. 14 is the same as the directions shown in FIGS. 15(1) to 15(3); that is, the direction S4' expressed in FIG. 15(4). In this case, the direction of s-polarization caused by the dichroic prism 4 is shown as a direction S5 in FIG. 15(5) (the same as the direction S4 in FIG. 15(4)). A vector S4' having the direction in which polarized light vibrates, is divided into the vector S5' having a direction parallel with the direction S5 shown in FIG. 15(5) (the direction of s-polarization caused by the dichroic prism 4) and a vector P5' having a direction perpendicular to the direction of the vector S5' (the direction of p-polarization caused by the dichroic prism 4).

The dichroic film 4p of the dichroic prism 4, formed with a dielectric film, generally causes a phase shift between the p-polarized light and the s-polarized light. The linear polarization is maintained until the light is incident on the dichroic prism 4 and is then reflected by the LCLV 5B. The light is changed to elliptical polarization on the light path (5) in FIG. 14 after the light flux passes through the dichroic prism 4. The same applies when the light flux passes through the dichroic mirror 3. When the light flux returns to the PBS 2, the polarized state will be significantly changed from linear polarization.

By contrast, in this example embodiment, since the light flux passes twice through the quarter-wave plate 7B, the direction of polarization of the light flux on the light path (4) in FIG. 14 is changed to the direction S4. The irregularity in polarization between the dichroic prism 4 and dichroic mirror 3 is therefore resolved, and light reflected by LCLV 5B falls on the PBS 2 with the linear polarization retained.

The direction of polarization S6 (comparable to the direction S5 in FIG. 15(5)) on the light path (6) in FIG. 14 is the same as the direction of s-polarization caused by the polarizing/separating film 2p of the PBS 2. Light is therefore fully reflected by the polarizing/separating film 2p of the PBS, whereby light loss is at an absolute minimum. Consequently, high image blackness is attained and the contrast of the projected image improves.

Unless the quarter-wave plate 7B were included, the component S6' shown in FIG. 15(6) would be reflected by the polarizing/separating film 2p, but the resultant component P6' would be transmitted by the polarizing/separating film 2p and would propagate toward the screen. This results in deterioration of contrast of the projected image.

The same principles apply to reflection from the dichroic mirror and dichroic prism 4. Likewise, the quarter-wave plates 7G and 7R are placed in front of the reflection LCLVs 5G and 5R, respectively, in such a manner that the axes of advancement thereof lie along the X-axis direction or Z-axis direction. This leads to improved contrast of a projected image.

The quarter-wave plates 7R, 7G, and 7B may be excluded. Once the polarizing/separating film 2p of the PBS 2, the dichroic film of the dichroic mirror 3, and the dichroic film 4d of the dichroic prism 4 are arranged substantially parallel with one another, the contrast of a projected image is improved. In other words, unless these elements are arranged substantially parallel with one another, whenever a light flux reaches the LCLV 7B, after being emitted from the PBS 2, or whenever a light flux returns from the LCLV 7B to the PBS 2, because the directions of s-polarization caused by the PBS 2, the dichroic mirror 3, and the dichroic prism 4 are mutually different, linear polarization is no longer attainable.

When the PBS, dichroic mirror, and dichroic prism are arranged substantially parallel with one another, the light flux polarization is retained as linear polarization, at least until the light flux reaches the LCLV. A change of the polarized state of the light having returned to the PBS 2 from linear polarization is, thus, small. Hence, the contrast of a projected image is improved. However, inclusion of quarter-wave plates, as discussed above, further improves the projected image quality.

As described previously, this embodiment provides the same advantages as the aforesaid embodiments. In addition, the shift of the direction of polarization due to an angle of incidence of a light flux incident on the PBS, and the irregularity in polarization between the dichroic films of the dichroic mirror and dichroic prism, are suppressed. Consequently, the contrast of a projected image is improved further.

According to a seventh example embodiment of the present invention, a color-projection apparatus comprises a polarizing beam splitter (PBS), a color-separation/combination optical system, first, second, and third LCLVs, and a projection-optical system. The PBS polarizes and separates the illumination-light flux, and the color-separation/combination optical system separates the first polarized light into first, second, and third color light fluxes, respectively.

The color-separation/combination optical system combines the color lights modulated by the first, second, and third LCLVs. The projection-optical system projects light detected by the PBS. The color-separation/combination optical system is preferably composed of a dichroic mirror for separating a first polarized light flux into a first color light and a light flux containing second and third color lights, which is separated by the dichroic mirror, into second color light and third color light.

The polarizing/separating film of the PBS, the dichroic film of the dichroic mirror, and the dichroic film of the dichroic prism are, preferably, arranged substantially parallel with one another.

According to the seventh example embodiment, as discussed above, since the dichroic films are arranged substantially parallel with one another, light returned to the PBS has little undesirable polarized light components. Thus, the contrast of the projected image is improved.

According to an eighth example embodiment of the present invention, the color projection apparatus preferably includes, in addition to the elements of the color projection apparatus of the seventh embodiment, first, second, and third quarter-wave plates respectively arranged between the dichroic mirror and a first LCLV, between the dichroic prism and a second LCLV, and between the dichroic prism and a third LCLV. The first, second, and third quarter-wave plates are substantially perpendicular to the optical axis. Additionally, the quarter-wave plates are disposed in a manner such that the axes of advancement or axes of retardation thereof are substantially contained within planes defined by the angle normal to the dichroic films of the dichroic mirror and dichroic prism and with the optical axis.

In the third to sixth example embodiments, the dichroic mirror 3, preferably, possesses the "green-light reflection property" (i.e., reflecting green light and transmitting light containing red and/or blue light). Green light reflected from the dichroic mirror 3 is routed into the green LCLV 5G, and light transmitted by the dichroic mirror 3 is separated into red light and blue light by the dichroic prism 4. The red light and blue light are routed to the corresponding LCLVs 5R and 5B.

The present invention, however, is not limited to the above structure. Alternatively, for example, the dichroic mirror 3 may possess the "green-light transmission property" (i.e., transmitting green light and reflecting light fluxes containing red light and/or blue light).

FIG. 16 shows the configuration of a color projection apparatus using a dichroic mirror having the green-light transmission property. For example, the dichroic mirror may possess the dichroism illustrated in FIG. 10(a). In FIG. 16, the reference numerals are the same as those assigned to the elements identical to or corresponding to those shown in the FIG.-9 apparatus.

The embodiment shown in FIG. 16, trimming filters 6R and 6B are placed near the emission surfaces of the dichroic prism 4 in the same manner as those in FIGS. 12 and 13, and quarter-wave plates 7R, 7G, and 7B are placed in front of the light valves 5R, 5G, and 5B associated with color light rays in the same manner as those in FIG. 13.

Having illustrated and described the principles of the invention, it should be apparent to those persons skilled in the art that the illustrated embodiments may be modified without departing from such principles. For example, in each example embodiment described above, the dichroic prism 4 preferably possesses dichroism as illustrated in FIG. 10(b) or FIG. 3(b). Alternatively, the dichroic prism 4 can possess dichroism that occurs when the relationship between transmittance values and reflectance values are reversed from that illustrated in FIG. 10(b) or FIG. 3(b). Additionally, although specific elements are referred to as substantially parallel with one another or substantially perpendicular to particular axes or planes, one skilled in the art could easily bend the optical light path utilizing. For example, a mirror to change the orientation of the elements while preserving the principles of the apparatus.

What is claimed is:

1. A color-projection apparatus, comprising:
   (a) a polarizing beam splitter comprising a polarization-splitting film for polarizing an illumination-light flux, comprising multiple colors of light, emitted from a light source to produce a first polarized light flux having a first polarization state, and a second polarized light flux having a second polarization state, the first polarized light flux being separated by the polarizing beam splitter from the second polarized light flux;
   (b) a first dichroic mirror comprising a dichroic film, parallel to the polarization-splitting film, for separating the first polarized light flux into a first color-light flux and a second color-light flux;
   (c) a first reflection light valve for receiving and modulating the first-color light flux so as to encode an image into the first-color light flux as the first-color light flux is reflected by the first reflection light valve to return to the first dichroic mirror;
   (d) a second reflection light valve for receiving and modulating the second-color light flux so as to encode the image into the second-color light flux as the second-color light flux is reflected by the second reflection light valve to return to the first dichroic mirror, the first dichroic mirror combining the modulated first-color light flux with the modulated second-color light flux into a combined modulated light flux and directing the combined modulated light flux toward the polarizing beam splitter; and
   (e) a projection lens for receiving the combined modulated light flux from the polarizing beam splitter and projecting the combined modulated light flux onto a viewing surface.

2. The apparatus of claim 1, wherein the first color-light flux comprises light of a first primary color, and the second color-light flux comprises light of a second primary color and a third primary color, the apparatus further comprising a second dichroic mirror comprising a second dichroic film, for receiving the second color-light flux and separating the second color-light flux into a second primary-color light flux and a third primary-color light flux.

3. The apparatus of claim 2, further comprising a third reflection light valve, the second reflection light valve being for receiving and modulating the second primary-color light flux, and the third reflection light valve being for receiving and modulating the third primary-color light flux, the second dichroic mirror combining the modulated second primary-color light flux with the modulated third primary-color light flux into a first combined modulated light flux that is combined by the first dichroic mirror with the modulated first-color light flux.

4. The apparatus of claim 2, wherein the second dichroic film is parallel to the first dichroic film.

5. The apparatus of claim 1, further comprising a quarter-wave plate situated between the first dichroic mirror and the first reflection light valve.

6. The apparatus of claim 5, wherein the quarter-wave plate is oriented perpendicularly to an optical axis extending between the first dichroic mirror and the first reflection light valve, and axes of advancement or axes of retardation are substantially contained on planes defined by lines normal to the first dichroic mirror with the optical axis.

7. The apparatus of claim 2, wherein the first primary color is green, the second primary color is blue, and the third primary color is red.

8. The apparatus of claim 3, further comprising a first trimming filter situated between the second dichroic mirror and the second primary-color light valve, and a second trimming filter situated between the second dichroic mirror and the third primary-color light valve.

9. The apparatus of claim 1, wherein the second color-light flux comprises light of a second color and a third color, the apparatus further comprising a dichroic prism comprising a dichroic film for separating the second color-light flux, propagating from the first dichroic mirror, into the light of the second color and the light of the third color.

10. The apparatus of claim 9, wherein the dichroic film of the dichroic prism is parallel with the polarizing film of the polarizing beam splitter and the dichroic film of the first dichroic mirror.

11. The apparatus of claim 10, further comprising a first quarter-wave plate situated on an optical path between the first dichroic mirror and the first reflection light valve and a second quarter-wave plate situated on an optical path between the dichroic prism and the second reflection light valve.

12. The apparatus of claim 1, wherein the first color-light flux is green light and the second color-light flux comprises blue and red light, the apparatus further comprising a dichroic prism for separating the blue light from the red light.

13. The apparatus of claim 12, wherein the dichroic mirror possesses dichroism of (1) substantially transmitting or reflecting s-polarized light having wavelengths less than a first transmission/reflection boundary wavelength that is equal to a first $\lambda$ that is near a boundary wavelength between green light and blue light, (2) substantially transmitting or reflecting s-polarized light having wavelengths greater than a second transmission/reflection boundary wavelength that is equal to a second $\lambda$ that is near a boundary wavelength between green light and red light, (3) substantially reflecting or transmitting s-polarized light having wavelengths within a wavelength range of from about the first $\lambda$ to about the second $\lambda$, (4) substantially transmitting or reflecting p-polarized light having wavelengths less than a third transmission/reflection boundary wavelength that is equal to a third λ that is near the boundary wavelength between green light and blue light, (5) substantially transmitting or reflecting p-polarized light having wavelengths greater than a fourth transmission/reflection boundary wavelength that is equal to a fourth λ that is near the boundary wavelength between green light and red light, and (6) reflecting or transmitting p-polarized light having wavelengths within a wavelength range of from about the third λ to about the fourth λ.; and wherein the dichroic prism possesses dichroism of (1) substantially transmitting or reflecting s-polarized light having wavelengths less than a fifth transmission/reflection boundary wavelength equal to a fifth λ, (2) substantially reflecting or transmitting s-polarized light having wavelengths greater than the fifth λ, (3) substantially transmitting or reflecting p-polarized light having wavelengths less than a sixth transmission/reflection boundary wavelength equal to a sixth λ, and (4) substantially reflecting or transmitting p-polarized light having wavelengths greater than the sixth λ, wherein (5) the fifth λ and sixth λ are within a wavelength range of from about a wavelength near the first λ or the third λ to about a wavelength near the second λ or the fourth λ.

14. The apparatus of claim 13, wherein the boundary wavelength between green light and blue light is about 500 nm.

15. The apparatus of claim 13, wherein the boundary wavelength between green light and red light is from about 560 nm to about 610 nm.

16. A color-projection apparatus, comprising:

(a) a light source for emitting an illumination-light flux;

(b) a polarizing beam splitter having a polarization-splitting film operable to polarize the illumination-light flux emitted from the light source into a first polarized light flux having a first polarization state and a second polarized light flux having a second polarization state, the polarizing beam splitter being operable to separate the first polarized light flux from the second polarized light flux;

(c) a first dichroic mirror comprising a first dichroic film for separating the first polarized light flux into a first color light and a light flux containing second and third color lights;

(d) a second dichroic mirror having a second dichroic film for separating the light flux containing the second and third color lights into a second color light and a third color light;

(e) a first reflection light valve for modulating the first color light into a first color light image, a second reflection light valve for modulating the second color light into a second color light image, and a third reflection light valve for modulating the third color light into a third color light image, the first reflection light valve directing the first color light image toward the first dichroic mirror, the second and third reflection light valves directing the second and third color light images toward the second dichroic mirror, the first and second dichroic mirrors combining the first, second, and third color light images into a single light flux and directing the single light flux toward the polarizing beam splitter for emission from the polarizing beam splitter;

(f) a projection lens for projecting the single light flux emitted from the polarizing beam splitter onto a viewing surface; and (g) the polarizing-splitting film of the beam splitter and the dichroic film of the first dichroic mirror being disposed substantially parallel with one another.

17. The apparatus of claim 16, wherein the polarizing-splitting film of the polarizing beam splitter, the dichroic film of the first dichroic mirror, and the dichroic film of the second dichroic mirror are disposed substantially parallel with one another.

18. The apparatus of claim 16, wherein the first dichroic mirror is operable to separate the first polarized light into a blue light and a light flux comprising green and red light, and the second dichroic mirror is operable to separate the light flux containing the green and red light into a blue light and a red light.

19. The apparatus of claim 16, further comprising a first quarter-wave plate disposed on an optical path between the first dichroic mirror and the first reflection light valve, and a second quarter-wave plate and a third quarter-wave plate disposed on an optical path between the second dichroic mirror and the second reflection light valve and between the second dichroic mirror and the third reflection light valve, respectively.

20. A color-projection apparatus, comprising:

(a) a light source for emitting an illumination-light flux;

(b) a polarizing beam splitter comprising a polarization-splitting film for polarizing the illumination-light flux emitted from the light source into s-polarized light and p-polarized light, and for separating the s-polarized light from the p-polarized light;

(c) a dichroic mirror comprising a dichroic film for separating the s-polarized light into a green light and a light flux containing blue and red light;

(d) a dichroic prism comprising a dichroic film for separating the light flux containing the blue and red light into a blue light and a red light;

(e) a first reflection light valve for modulating the green light into a green light image, a second reflection light valve for modulating the blue light into a blue light image, and a third reflection light valve for modulating the red light into a red light image, the first reflection light valve directing the green light image toward the dichroic mirror, the second and third reflection light valves directing the blue and red light images toward the dichroic prism, wherein the dichroic mirror and the dichroic prism combine the green, red, and blue light images into a single light flux and direct the single light flux toward the polarizing beam splitter for emission by the polarizing beam splitter;

(f) a projection lens for projecting the single light flux emitted from the polarizing beam splitter on a viewing surface;

(g) wherein the dichroic mirror possesses dichroism of (1) substantially transmitting or reflection s-polarized light having wavelengths less than a first transmission/reflection boundary wavelength that is equal to a first λ that is near a boundary wavelength between green light and blue light, (2) substantially transmitting or reflecting s-polarized light having wavelengths greater than a second transmission/reflection boundary wavelength that is equal to a second λ that is near a boundary wavelength between green light and red light, (3) substantially reflecting or transmitting s-polarized light having wavelengths within a wavelength range of from about the first λ to about the second λ, (4) substantially transmitting or reflecting p-polarized light having wavelengths less than a third transmission/reflection boundary wavelength that is equal to a third λ that is near the boundary wavelength between green light and blue light, (5) substantially transmitting or reflecting p-polarized light having wavelengths greater than a fourth transmission/reflection boundary wavelength that is equal to a fourth λ that is near the boundary wavelength between green light and red light, and (6) reflecting or transmitting p-polarized light having wavelengths within a wavelength range of from about the third λ to about the fourth λ; and (h) wherein the dichroic prism possesses dichroism of (1) substantially transmitting or reflecting s-polarized light having wavelengths less than a fifth transmission/reflection boundary wavelength equal to a fifth λ, (2) substantially reflecting or transmitting s-polarized light having wavelengths greater than the fifth λ, (3) substantially transmitting or reflecting p-polarized light having wavelengths less than a sixth transmission/reflection boundary wavelength equal to a sixth λ, and (4) substantially reflecting or transmitting p-polarized light having wavelengths greater than the sixth λ, wherein (5) the fifth λ and the sixth λ are within a wavelength range of from about a wavelength near the first λ or the third λ to about a wavelength near the second λ or the fourth λ.

21. The apparatus of claim 20, wherein the boundary wavelength between green light and blue light is about 500 nm.

22. The apparatus of claim 20, wherein the boundary wavelength between green light and red light is from about 560 nm to about 610 nm.

23. The apparatus of claim 20, further comprising:
a first trimming filter for eliminating an amount of blue light after the blue light is separated by and emitted from the dichroic prism, wherein the blue light eliminate by the first trimming filter has wavelengths substantially within a wavelength band of green light; and
a second trimming filter for eliminating an amount of red light after the red light is separated by and emitted from the dichroic prism, wherein the red light eliminated by the second trimming filter has wavelengths substantially within a wavelength band of green light.

24. The apparatus of claim 23, wherein the wavelength band of green light is from about 500 nm to about 560 nm.

25. The apparatus of claim 20, wherein the polarizing-splitting film of the polarizing beam splitter, the dichroic film of the dichroic mirror, and the dichroic film of the dichroic prism are substantially parallel with one another.

26. The apparatus of claim 20, further comprising first, second, and third quarter-wave plates disposed between the dichroic mirror and the first reflection light valve, between the dichroic prism and the second reflection light valve, and between the dichroic prism and a third reflection light valve, respectively.

27. The apparatus of claim 26, wherein the first, second, and third quarter-wave plates are disposed in the apparatus substantially perpendicular to an optical axis.

28. The apparatus of claim 27, wherein axes of advancement or axes of retardation of the first, second, and third quarter-wave plates are substantially contained on planes defined by lines normal to the dichroic film of the dichroic mirror and the dichroic film of the dichroic prism with an optical axis.

29. A color-projection apparatus, comprising:
(a) a light source for emitting an illumination-light flux;
(b) a polarizing beam splitter having a polarization-splitting film for polarizing the illumination-light flux emitted from the light source into a first polarized light flux having a first polarization state and a second polarization light flux having a second polarization state, and for separating the first polarized light flux from the second polarized light flux;

(c) a dichroic mirror comprising a dichroic film for separating the first polarized light flux into a first color light and a light flux comprising a second and a third color light;

(d) a dichroic prism comprising a dichroic film for separating the light flux comprising the second and third color light into the second color light and the third color light;

(e) a first reflection light valve for modulating the first color light into a first color light image, a second reflection light valve for modulating the second color light into a second color light image, and a third reflection light valve for modulating the third color light into a third color light image, the first reflection light valve directing the first color light image toward the dichroic mirror, the second and third reflection light valves directing the second and third color light images, respectively, toward the dichroic prism, the dichroic mirror and the dichroic prism combining the first, second, and third color light images into a single light flux and directing the single light flux toward the polarizing beam splitter;

(f) a projection lens for projecting the single light flux emitted from the polarizing beam splitter onto a viewing surface; and (g) wherein the polarization-splitting film of the polarizing beam splitter, the dichroic film of the dichroic mirror, and the dichroic film of the dichroic prism are substantially parallel with one another.

30. The apparatus of claim 29, wherein the first color light is green light, the second color light is red light, and the third color light is blue light.

31. The apparatus of claim 30, further comprising:
a first trimming filter for eliminating an amount of the blue light after the blue light is separated by and emitted from the dichroic prism, the blue light eliminated by the first trimming filter comprising wavelengths substantially within a wavelength band of green light; and
a second trimming filter for eliminating an amount of red light after the red light is separated by and emitted from the dichroic prism, the red light eliminated by the second trimming filter comprising wavelengths substantially within a wavelength band of green light.

32. The apparatus of claim 31, wherein the wavelength band of green light is from about 500 nm to about 560 nm.

33. The apparatus of claim 29, further comprising first, second, and third quarter-wave plates disposed between the dichroic mirror and the first reflection light valve, between the dichroic prism and the second reflection light valve, and between the dichroic prism and a third reflection light valve, respectively.

34. The apparatus of claim 33, wherein the first, second, and third quarter-wave plates are disposed in the apparatus substantially perpendicular to an optical axis.

35. The apparatus of claim 34, wherein axes of advancement or axis of retardation of the first, second, and third quarter-wave plates are substantially contained on planes defined by lines normal to the dichroic film of the dichroic mirror and the dichroic film of the dichroic prism with an optical axis.

36. A color-projection apparatus, comprising:
(a) a first color-separating device, comprising a first color-separating surface for separating an illumination-light flux, comprising multiple colors of light and emitted from a light source, into a first color-light flux and a second color-light flux, wherein the first color-light flux comprises a green-light flux and the second color-light flux comprises a blue-light flux and a red-light flux;
(b) a second color-separating device, comprising a second color-separating surface including a dichroic film situated so as to receive the second color-light flux and configured to separate the second color-light flux into the blue-light flux and the red-light flux, the dichroic film of the second color-separating device possessing dichroism of substantially transmitting or reflecting a boundary wavelength of s-polarized light and dichroism of substantially transmitting or reflecting a boundary wavelength of p-polarized light, the boundary wavelengths being within a wavelength band of the green-light flux separated by the first color-separating device;
(c) a first reflection light valve situated and configured for receiving and modulating the green-light flux so as to encode an image into the green-light flux as the green-light flux is reflected by the first reflection light valve to return to the first color-separating device;
(d) a second reflection light valve situated and configured for receiving and modulating the blue-light flux so as to encode an image into the blue-light flux as the blue-light flux is reflected by the second reflection light valve to return to the second color-separating device; and
(e) a third reflection light valve situated and configured for receiving and modulating the red-light flux so as to encode the image into the red-light flux as the red-light flux is reflected by the third reflection light valve to return to the second color-separating device, the second color-separating device being configured to combine the modulated light flux and to direct the first combined modulated light flux toward the first color-separating device, and the first color-separating device being configured to combine the modulated green-light flux with the first combined modulated light flux into a second combined modulated light flux and to direct the second combined modulated light flux toward a viewing surface.

37. The apparatus of claim 36, further comprising a projection lens situated and configured for receiving the combined modulated light flux from the first color-separating device and projecting the combined modulated light flux onto the viewing surface.

38. The apparatus of claim 36, further comprising a light source configured to emit the illumination-light flux.

39. The apparatus of claim 36, wherein the second color-separating device includes a dichroic prism.

40. The apparatus of claim 36, wherein the second color-separating device includes a dichroic mirror.

41. The apparatus of claim 36, wherein the second color-separating surface of the second color-separating device is parallel to the first color-separating surface of the first color-separating device.

42. A method for manufacturing a color-projection apparatus, comprising:
providing a polarizing beam splitter comprising a polarization-splitting film;
directing an illumination-light flux, comprising multiple colors of light and emitted from a light source, to the polarizing beam splitter so as to produce a first polarized light flux having a first polarization state, and a second polarized light flux having a second polarization state;
using the polarizing beam splitter, separating the first polarized light flux from the second polarized light flux;
situating a first dichroic mirror, comprising a dichroic film, parallel to the polarization-splitting film so as to allow the first dichroic mirror to separate the first polarized light flux into a first color-light flux and a second color-light flux;
situating a first reflection light valve to receive and modulate the first color-light flux so as to encode an image into the first-color light flux as the first color-light flux is reflected by the first reflection light valve to return to the first dichroic mirror;
situating a second reflection light valve to receive and modulate the second color-light flux so as to encode the image into the second color-light flux as the second color-light flux is reflected by the second reflection light valve to return to the first dichroic mirror; and
using the first dichroic mirror, combining the modulated first color-light flux with the modulated second color-light flux into a combined modulated light flux and directing the combined modulated light flux toward the polarizing beam splitter.

43. A method for manufacturing a color-projection apparatus, comprising:
providing a first color-separating device comprising a first color-separating surface;
directing an illumination-light flux, comprising multiple colors of light and emitted from a light source, to the first color-separating device so as to separate the illumination-light flux into a first color-light flux and a second color-light flux, the first color-light flux comprising a green-light flux, and the second color-light flux comprising a blue-light flux and a red-light flux;
providing a second color-separating device comprising a second color-separating surface including a dichroic film that possesses dichroism of substantially transmitting or reflecting a boundary wavelength of s-polarized light and dichroism of substantially transmitting or reflecting a boundary wavelength of p-polarized light, the boundary wavelengths being within a wavelength band of the green-light flux separated by the first color-separating device;
directing the second color-light flux to the second color-separating device so as to allow the second color-separating device to separate the second color-light flux into the blue-light flux and the red-light flux;
situating a first reflection light valve for receiving and modulating the green-light flux so as to encode an image into the green-light flux as the green-light flux is reflected by the first reflection light valve to return to the first color-separating device;
situating a second reflection light valve for receiving and modulating the blue-light flux so as to encode an image into the blue-light flux as the blue-light flux is reflected by the second reflection light valve to return to the second color-separating device; and
situating a third reflection light valve for receiving and modulating the red-light flux so as to encode an image into the red-light flux as the red-light flux is reflected by the third reflection light valve to return to the second color-separating device.

* * * * *

UNITED STATES PATENT AND TRADEMARK OFFICE
CERTIFICATE OF CORRECTION

PATENT NO. : 6,507,326 B2
DATED : January 14, 2003
INVENTOR(S) : Manabe et al.

It is certified that error appears in the above-identified patent and that said Letters Patent is hereby corrected as shown below:

<u>Title page,</u>
Item [63], Related U.S. Application Data, after "Feb. 29, 2000" the following should be added -- , which is a continuation of application no. 08/889,749, filed on July 8, 1997, now abandoned --.

<u>Column 3,</u>
Line 50, "s-polarized light" should be -- s-polarized-light --.
Line 57, a comma -- , -- should be inserted after "Hence".

<u>Column 5,</u>
Line 8, a comma -- , -- should be inserted after "thus".

<u>Column 6,</u>
Line 19, "of the" should be -- or the --.

<u>Column 7,</u>
Line 52, "10j)" should be -- 10(j) --.
Line 58, "embodied" should be -- embodiment --.

<u>Column 9,</u>
Line 25, -- light -- should be inserted after "p-polarized".
Line 65, "Y" should be -- –Y --.

<u>Column 11,</u>
Line 12, "so to be" should be -- so as to be --.
Line 66, "reflects" should be -- reflect --.

<u>Column 12,</u>
Line 46, "have" should be -- having --.
Line 54, -- light -- should be inserted after "s-polarized".

<u>Column 13,</u>
Line 11, "(1" should be -- (1) --.
Line 50, "larger" should be -- large --.

<u>Column 14,</u>
Line 46, "4dof" should be -- 4d of --.

<u>Column 16,</u>
Line 13, "S-polarized" should be -- s-polarized --.

UNITED STATES PATENT AND TRADEMARK OFFICE
CERTIFICATE OF CORRECTION

PATENT NO. : 6,507,326 B2
DATED : January 14, 2003
INVENTOR(S) : Manabe et al.

It is certified that error appears in the above-identified patent and that said Letters Patent is hereby corrected as shown below:

<u>Column 18,</u>
Line 17, "fin" should be -- in --.
Lines 34-35, "the FIG.12 embodiment" should be -- the FIG.-12 embodiment --.

<u>Column 20,</u>
Line 1, "7R and 7G" should be -- 7R, 7G, and 7B --.
Line 12, "as" should be -- at --.

<u>Column 22,</u>
Lines 28-29, "second and third color lights, which" should be -- second and third color lights. A dichroic prism separates the light flux containing the second and third color lights, which --.

<u>Column 23,</u>
Line 8, "shown in FIG. 16, trimming" should be
    -- shown in FIG. 16 provides the same
    advantages as the third embodiment shown in
    FIG. 9.

In the configuration shown in FIG. 16,
trimming --.

<u>Column 27,</u>
Lines 35-36, "eliminate" should be -- eliminated --.

Signed and Sealed this

Twenty-seventh Day of January, 2004

JON W. DUDAS
*Acting Director of the United States Patent and Trademark Office*